US012772366B2

(12) United States Patent
Niell, III et al.

(10) Patent No.: US 12,772,366 B2
(45) **Date of Patent: *Oct. 20, 2026**

(54) INDUCTIVELY COUPLED PLASMA LIGHT SOURCE WITH SWITCHED POWER SUPPLY

(71) Applicants: Hamamatsu Photonics K.K., Shizuoka (JP); Energetiq Technology, Inc., Wilmington, MA (US)

(72) Inventors: Frederick Marvin Niell, III, Tampa, FL (US); Donald K. Smith, Newton, MA (US); Matthew M. Besen, Andover, MA (US); Stephen F. Horne, Medford, MA (US); David B. Reisman, Albuquerque, NM (US); Daniel J. Arcaro, Medford, MA (US); Michael J. Roderick, Everett, MA (US)

(73) Assignees: Hamamatsu Photonics K.K., Shizuoka (JP); Energetiq Technology, Inc., Wilmington, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/928,527

(22) Filed: Oct. 28, 2024

(65) Prior Publication Data

US 2025/0056705 A1 Feb. 13, 2025

Related U.S. Application Data

(63) Continuation of application No. 18/077,443, filed on Dec. 8, 2022, now Pat. No. 12,156,322.

(51) Int. Cl.

| | |
|---|---|
| ***H05H 1/00*** | (2006.01) |
| ***H01J 37/32*** | (2006.01) |
| ***H05H 1/10*** | (2006.01) |

(52) U.S. Cl.
CPC .................................... *H05H 1/10* (2013.01)

(58) Field of Classification Search
CPC .. H05H 1/00; H05H 1/02; H05H 1/06; H05H 1/0087; H05H 1/10; H05H 1/46;
(Continued)

(56) References Cited

U.S. PATENT DOCUMENTS

| | | |
|---|---|---|
| 3,054,921 A | 9/1962 | Lye |
| 3,227,923 A | 1/1966 | Marrison |

(Continued)

FOREIGN PATENT DOCUMENTS

| | | |
|---|---|---|
| CN | 1509419 A | 6/2004 |
| CN | 101770930 A | 7/2010 |

(Continued)

OTHER PUBLICATIONS

International Preliminary Report on Patentability received for PCT Application No. PCT/US2023/081409, mailed on Jun. 19, 2025, 6 pages.

(Continued)

*Primary Examiner* — Thai Pham
(74) *Attorney, Agent, or Firm* — Rauschenbach Patent Law Group, PLLC; Kurt Rauschenbach

(57) ABSTRACT

A method and apparatus for generating light includes a chamber having a high voltage region, a low voltage region, and a plasma generation region that defines a plasma confinement region. A magnetic core is positioned around the chamber and is configured to generate a plasma in the plasma confinement region. A switched power supply includes a DC power supply and a switched resonant charging circuit that together generate a plurality of voltage pulses at the output causing a plurality of current pulses to be applied to the power delivery section around the magnetic core so that at least one plasma loop is established around (Continued)

the magnetic core that confines plasma in the plasma confinement region, thereby forming a magnetically confined Z-pinch plasma. Light generated by the Z-pinch plasma propagates out of a port in the light source.

22 Claims, 6 Drawing Sheets

(58) Field of Classification Search
CPC .............. H05H 1/4652; G03F 7/70008; G03F 7/70033; H03K 3/00; H03K 3/02; H03K 3/021
See application file for complete search history.

(56) References Cited

U.S. PATENT DOCUMENTS

| | | | |
|---|---|---|---|
| 3,418,507 | A | 12/1968 | Young |
| 3,427,564 | A | 2/1969 | Okaya et al. |
| 3,454,921 | A | 7/1969 | Coleman |
| 3,495,118 | A | 2/1970 | Richter |
| 3,502,929 | A | 3/1970 | Richter |
| 3,582,822 | A | 6/1971 | Karney |
| 3,619,588 | A | 11/1971 | Chambers |
| 3,636,395 | A | 1/1972 | Banes, Jr. et al. |
| 3,641,389 | A | 2/1972 | Leidigh |
| 3,657,588 | A | 4/1972 | Mcrae |
| 3,731,133 | A | 5/1973 | Mcrae et al. |
| 3,764,466 | A | 10/1973 | Dawson |
| 3,806,496 | A | 4/1974 | Shorr et al. |
| 3,808,496 | A | 4/1974 | Mcrae et al. |
| 3,826,996 | A | 7/1974 | Jaegle et al. |
| 3,900,803 | A | 8/1975 | Silfvast et al. |
| 3,911,318 | A | 10/1975 | Spero et al. |
| 3,949,258 | A | 4/1976 | Soodak |
| 3,982,201 | A | 9/1976 | Rosenkrantz et al. |
| 4,054,812 | A | 10/1977 | Lessner et al. |
| 4,063,803 | A | 12/1977 | Wright et al. |
| 4,088,966 | A | 5/1978 | Samis |
| 4,152,625 | A | 5/1979 | Conrad |
| 4,177,435 | A | 12/1979 | Brown |
| 4,179,037 | A | 12/1979 | Chan et al. |
| 4,179,566 | A | 12/1979 | Nadelson |
| 4,263,095 | A | 4/1981 | Thode |
| 4,272,681 | A | 6/1981 | Fill et al. |
| 4,485,333 | A | 11/1984 | Goldberg |
| 4,498,029 | A | 2/1985 | Yoshizawa et al. |
| 4,536,640 | A | 8/1985 | Vukanovic |
| 4,599,540 | A | 7/1986 | Roberts |
| 4,633,128 | A | 12/1986 | Roberts et al. |
| 4,646,215 | A | 2/1987 | Levin et al. |
| 4,702,716 | A | 10/1987 | Roberts |
| 4,724,352 | A | 2/1988 | Schuda et al. |
| RE32,626 | E | 3/1988 | Yoshizawa et al. |
| 4,730,895 | A | 3/1988 | Siedband et al. |
| 4,780,608 | A | 10/1988 | Cross et al. |
| 4,785,216 | A | 11/1988 | Roberts et al. |
| 4,789,788 | A | 12/1988 | Cox |
| 4,866,517 | A | 9/1989 | Mochizuki et al. |
| 4,868,458 | A | 9/1989 | Davenport et al. |
| 4,872,189 | A | 10/1989 | Frankel et al. |
| 4,889,605 | A | 12/1989 | Asmus et al. |
| 4,901,330 | A | 2/1990 | Wolfram et al. |
| 4,978,893 | A | 12/1990 | Brannon et al. |
| 4,979,893 | A | 12/1990 | Pappalardo et al. |
| 5,052,780 | A | 10/1991 | Klein |
| 5,153,673 | A | 10/1992 | Amirav |
| 5,299,279 | A | 3/1994 | Roberts |
| 5,317,618 | A | 5/1994 | Nakahara et al. |
| 5,334,913 | A | 8/1994 | Ury et al. |
| 5,359,621 | A | 10/1994 | Tsunoda et al. |
| 5,418,420 | A | 5/1995 | Roberts |
| 5,442,184 | A | 8/1995 | Palmer et al. |
| 5,506,857 | A | 4/1996 | Meinzer |
| 5,508,034 | A | 4/1996 | Bernstein |
| 5,508,934 | A | 4/1996 | Moslehi et al. |
| 5,516,857 | A | 5/1996 | Mann |
| 5,561,338 | A | 10/1996 | Roberts et al. |
| 5,672,931 | A | 9/1997 | Kiss et al. |
| 5,686,996 | A | 11/1997 | Fidler et al. |
| 5,789,863 | A | 8/1998 | Takahashi et al. |
| 5,790,575 | A | 8/1998 | Zamel et al. |
| 5,801,495 | A | 9/1998 | Smolka et al. |
| 5,903,088 | A | 5/1999 | Sugitani et al. |
| 5,905,268 | A | 5/1999 | Garcia et al. |
| 5,923,116 | A | 7/1999 | Mercer et al. |
| 5,940,182 | A | 8/1999 | Lepper, Jr. et al. |
| 6,005,332 | A | 12/1999 | Mercer |
| 6,025,916 | A | 2/2000 | Quick et al. |
| 6,061,379 | A | 5/2000 | Schoen |
| 6,074,516 | A | 6/2000 | Howald et al. |
| 6,106,091 | A | 8/2000 | Osawa et al. |
| 6,108,091 | A | 8/2000 | Pecen et al. |
| 6,129,807 | A | 10/2000 | Grimbergen et al. |
| 6,181,053 | B1 | 1/2001 | Roberts |
| 6,184,517 | B1 | 2/2001 | Sawada et al. |
| 6,200,005 | B1 | 3/2001 | Roberts et al. |
| 6,212,989 | B1 | 4/2001 | Beyer et al. |
| 6,235,147 | B1 | 5/2001 | Lee et al. |
| 6,236,147 | B1 | 5/2001 | Capobianco |
| 6,265,813 | B1 | 7/2001 | Knox et al. |
| 6,274,970 | B1 | 8/2001 | Capobianco |
| 6,275,565 | B1 | 8/2001 | Tomie |
| 6,281,629 | B1 | 8/2001 | Tanaka et al. |
| 6,285,131 | B1 | 9/2001 | Kiss et al. |
| 6,288,780 | B1 | 9/2001 | Fairley et al. |
| 6,316,867 | B1 | 11/2001 | Roberts et al. |
| 6,331,993 | B1 | 12/2001 | Brown |
| 6,339,279 | B1 | 1/2002 | Miyamoto et al. |
| 6,339,280 | B1 | 1/2002 | Miyamoto et al. |
| 6,351,058 | B1 | 2/2002 | Roberts |
| 6,374,012 | B1 | 4/2002 | Bergmann et al. |
| 6,400,067 | B1 | 6/2002 | Manning et al. |
| 6,400,089 | B1 | 6/2002 | Salvermoser et al. |
| 6,414,436 | B1 | 7/2002 | Eastlund et al. |
| 6,417,625 | B1 | 7/2002 | Brooks et al. |
| 6,445,134 | B1 | 9/2002 | Asmus |
| 6,493,364 | B1 | 12/2002 | Baumler et al. |
| 6,504,319 | B2 | 1/2003 | Herter |
| 6,504,903 | B1 | 1/2003 | Kondo et al. |
| 6,532,100 | B1 | 3/2003 | Partanen et al. |
| 6,541,924 | B1 | 4/2003 | Kane et al. |
| 6,597,087 | B2 | 7/2003 | Roberts et al. |
| 6,602,104 | B1 | 8/2003 | Roberts |
| 6,670,758 | B2 | 12/2003 | Beech et al. |
| 6,737,809 | B2 | 5/2004 | Espiau et al. |
| 6,762,849 | B1 | 7/2004 | Rulkens |
| 6,768,264 | B2 | 7/2004 | Beech et al. |
| 6,788,404 | B2 | 9/2004 | Lange |
| 6,795,182 | B2 | 9/2004 | Rakuljic et al. |
| 6,816,323 | B2 | 11/2004 | Colin et al. |
| 6,821,377 | B2 | 11/2004 | Saito et al. |
| 6,834,984 | B2 | 12/2004 | Tausch et al. |
| 6,865,255 | B2 | 3/2005 | Richardson |
| 6,867,419 | B2 | 3/2005 | Tajima |
| 6,914,919 | B2 | 7/2005 | Watson et al. |
| 6,956,329 | B2 | 10/2005 | Brooks et al. |
| 6,956,885 | B2 | 10/2005 | Taylor et al. |
| 6,970,492 | B2 | 11/2005 | Govorkov et al. |
| 6,972,421 | B2 | 12/2005 | Melnychuk et al. |
| 7,050,149 | B2 | 5/2006 | Owa et al. |
| 7,072,367 | B2 | 7/2006 | Arisawa et al. |
| 7,087,914 | B2 | 8/2006 | Akins et al. |
| 7,158,221 | B2 | 1/2007 | Davis et al. |
| 7,164,144 | B2 | 1/2007 | Partlo et al. |
| 7,176,633 | B1 | 2/2007 | Roberts |
| 7,274,435 | B2 | 9/2007 | Hiura et al. |
| 7,307,375 | B2 * | 12/2007 | Smith .................. H01J 65/048 313/31 |
| 7,368,741 | B2 | 5/2008 | Melnychuk et al. |
| 7,399,961 | B2 | 7/2008 | Chen et al. |
| 7,399,981 | B2 | 7/2008 | Cheymol et al. |
| 7,427,167 | B2 | 9/2008 | Holder et al. |
| 7,429,818 | B2 | 9/2008 | Chang et al. |

(56) References Cited

U.S. PATENT DOCUMENTS 7,435,982 B2 10/2008 Smith
7,439,497 B2 10/2008 Dantus et al.
7,439,530 B2 10/2008 Ershov et al.
7,456,417 B2 11/2008 Murakami et al.
7,567,607 B2 7/2009 Knowles et al.
7,571,349 B2 8/2009 Levidow et al.
7,598,509 B2 10/2009 Ershov et al.
7,632,419 B1 12/2009 Grimbergen et al.
7,652,430 B1 1/2010 Delgado
7,671,349 B2 3/2010 Bykanov et al.
7,679,027 B2 3/2010 Bogatu
7,679,276 B2 3/2010 Blondia et al.
7,680,158 B2 3/2010 Endo et al.
7,705,331 B1 4/2010 Kirk et al.
7,773,656 B1 8/2010 Mills
7,786,455 B2 8/2010 Smith
7,795,816 B2 9/2010 Jennings et al.
7,989,786 B2 8/2011 Smith et al.
8,003,963 B2 8/2011 Nagai et al.
8,143,790 B2 * 3/2012 Smith .................. H01J 65/048 315/111.11
8,148,900 B1 4/2012 Kirk et al.
8,242,671 B2 8/2012 Blondia et al.
8,242,695 B2 8/2012 Sumitomo et al.
8,253,926 B2 8/2012 Sumitomo et al.
8,309,943 B2 11/2012 Smith et al.
8,320,424 B2 11/2012 Bolt et al.
8,427,067 B2 4/2013 Espiau et al.
8,525,138 B2 9/2013 Smith et al.
8,610,095 B2 12/2013 Yabu et al.
8,710,475 B2 4/2014 Komori et al.
8,969,841 B2 3/2015 Smith
9,048,000 B2 6/2015 Smith
9,185,786 B2 11/2015 Smith
9,506,871 B1 11/2016 Flock
9,576,785 B2 2/2017 Blondia
9,609,732 B2 3/2017 Smith
9,678,262 B2 6/2017 Görtz et al.
9,741,553 B2 8/2017 Blondia
9,748,086 B2 8/2017 Blondia
9,922,814 B2 3/2018 Blondia
10,006,865 B1 6/2018 Shaughnessy et al.
10,008,378 B2 6/2018 Blondia
10,057,973 B2 8/2018 Blondia
10,078,167 B2 9/2018 Brune et al.
10,109,473 B1 10/2018 Blondia et al.
10,186,414 B2 1/2019 Blondia
10,186,416 B2 1/2019 Blondia
10,203,247 B2 2/2019 Brady et al.
10,217,625 B2 2/2019 Bezel et al.
10,222,701 B2 3/2019 Zhao et al.
10,770,282 B1 9/2020 Abramenko et al.
10,964,523 B1 3/2021 Gayasov et al.
11,587,781 B2 2/2023 Partlow et al.
11,784,037 B2 10/2023 Partlow et al.
12,014,918 B2 6/2024 Partlow et al.
12,144,072 B2 11/2024 Partlow et al.
12,156,322 B2 11/2024 Niell, III et al.
12,165,856 B2 12/2024 Horne et al.
12,176,200 B2 12/2024 Partlow et al.
2001/0035720 A1 11/2001 Guthrie et al.
2002/0021508 A1 2/2002 Ishihara
2002/0036820 A1 3/2002 Merriam et al.
2002/0044624 A1 4/2002 Davis et al.
2002/0044629 A1 4/2002 Hertz et al.
2002/0080834 A1 6/2002 Kusunose
2002/0172235 A1 11/2002 Chang et al.
2003/0006381 A1 1/2003 Yoo
2003/0006383 A1 1/2003 Melnychuk et al.
2003/0034736 A1 2/2003 Eastlund et al.
2003/0052609 A1 3/2003 Eastlund et al.
2003/0066139 A1 4/2003 Go et al.
2003/0068012 A1 4/2003 Ahmad et al.
2003/0086139 A1 5/2003 Wing So
2003/0090902 A1 5/2003 Kavanagh
2003/0147499 A1 8/2003 Kondo
2003/0168982 A1 9/2003 Kim
2003/0193281 A1 10/2003 Manning
2003/0231496 A1 12/2003 Sato et al.
2004/0008433 A1 1/2004 Margeson
2004/0016894 A1 1/2004 Wester
2004/0018647 A1 1/2004 Jones et al.
2004/0026512 A1 2/2004 Otsubo
2004/0071267 A1 4/2004 Jacob et al.
2004/0084406 A1 5/2004 Kamp et al.
2004/0108473 A1 6/2004 Melnychuk et al.
2004/0129896 A1 7/2004 Schmidt et al.
2004/0134426 A1 7/2004 Tomoyasu
2004/0183031 A1 9/2004 Silverman et al.
2004/0183038 A1 9/2004 Hiramoto et al.
2004/0218172 A1 11/2004 Deverse et al.
2004/0238762 A1 12/2004 Mizoguchi et al.
2004/0239894 A1 12/2004 Shimada
2004/0245350 A1 12/2004 Zeng
2004/0264512 A1 12/2004 Hartlove et al.
2005/0057158 A1 3/2005 Chang et al.
2005/0167618 A1 8/2005 Hoshino et al.
2005/0168148 A1 8/2005 Allen et al.
2005/0199829 A1 9/2005 Partlo et al.
2005/0205803 A1 9/2005 Mizoguchi
2005/0205811 A1 9/2005 Partlo et al.
2005/0207454 A1 9/2005 Starodoumov et al.
2005/0225739 A1 10/2005 Hiura
2005/0230645 A1 10/2005 Melnychuk et al.
2005/0243390 A1 11/2005 Tejnil
2005/0270528 A1 12/2005 Geshwind et al.
2005/0276285 A1 12/2005 Huang et al.
2006/0017387 A1 * 1/2006 Smith .................... H05G 2/007 315/111.51
2006/0039435 A1 2/2006 Cheymol et al.
2006/0131515 A1 6/2006 Partlo et al.
2006/0152128 A1 7/2006 Manning
2006/0176925 A1 8/2006 Nakano
2006/0186356 A1 8/2006 Imai et al.
2006/0192152 A1 8/2006 Ershov et al.
2006/0202625 A1 9/2006 Song
2006/0215712 A1 9/2006 Ziener et al.
2006/0219957 A1 10/2006 Ershov et al.
2006/0228072 A1 10/2006 Davis et al.
2006/0255298 A1 11/2006 Bykanov et al.
2007/0001131 A1 1/2007 Ershov et al.
2007/0210717 A1 * 9/2007 Smith .................... H05G 2/007 315/112
2007/0228288 A1 10/2007 Smith
2007/0228300 A1 10/2007 Smith
2007/0285921 A1 12/2007 Zulim et al.
2008/0048133 A1 2/2008 Bykanov et al.
2008/0055712 A1 3/2008 Noelscher et al.
2008/0059096 A1 3/2008 Stenstrom et al.
2008/0099699 A1 * 5/2008 Yabuta ................. H05G 2/0094 250/504 R
2008/0180029 A1 7/2008 Hergenhan et al.
2008/0260335 A1 10/2008 Laitala et al.
2009/0032740 A1 2/2009 Smith et al.
2009/0091273 A1 * 4/2009 Horioka ................... H05G 1/46 315/308
2009/0196801 A1 8/2009 Mills
2009/0267003 A1 10/2009 Moriya et al.
2009/0314967 A1 12/2009 Moriya et al.
2010/0164380 A1 7/2010 Sumitomo
2010/0165656 A1 7/2010 Yasuda et al.
2010/0172014 A1 7/2010 Kanade et al.
2010/0181503 A1 7/2010 Yanagida et al.
2010/0253935 A1 10/2010 Mackinnon et al.
2010/0264820 A1 10/2010 Sumitomo et al.
2011/0084717 A1 4/2011 Fong et al.
2011/0150590 A1 6/2011 Buchner
2011/0181191 A1 7/2011 Smith et al.
2011/0204265 A1 8/2011 Smith et al.
2011/0291566 A1 12/2011 Bezel et al.
2013/0234597 A1 9/2013 Kusunose et al.
2013/0342105 A1 12/2013 Shchemelinin et al.
2014/0071406 A1 3/2014 Manni et al.
2014/0117258 A1 5/2014 Smith

(56) References Cited

U.S. PATENT DOCUMENTS

| | | | |
|---|---|---|---|
| 2014/0197733 A1 | 7/2014 | Delgado | |
| 2014/0268127 A1 | 9/2014 | Day | |
| 2015/0021500 A1 | 1/2015 | Smith | |
| 2015/0034838 A1 | 2/2015 | Bezel et al. | |
| 2015/0131137 A1 | 5/2015 | Burry et al. | |
| 2015/0289353 A1 | 10/2015 | Smith | |
| 2016/0057845 A1 | 2/2016 | Smith | |
| 2016/0057854 A1 | 2/2016 | Schneider et al. | |
| 2016/0093463 A1 | 3/2016 | Bhattacharjee et al. | |
| 2017/0052118 A1 | 2/2017 | Loock et al. | |
| 2017/0135192 A1 | 5/2017 | Blondia | |
| 2017/0150590 A1 | 5/2017 | Chimmalgi et al. | |
| 2017/0213704 A1 | 7/2017 | Chen et al. | |
| 2019/0021158 A1 | 1/2019 | Nozaki | |
| 2019/0037676 A1 | 1/2019 | Khodykin et al. | |
| 2019/0045615 A1 | 2/2019 | Mori et al. | |
| 2019/0053364 A1 | 2/2019 | Mori et al. | |
| 2019/0075641 A1 | 3/2019 | Kuritsyn et al. | |
| 2019/0302570 A1 | 10/2019 | Kumar et al. | |
| 2020/0012165 A1 | 1/2020 | Haller | |
| 2020/0051785 A1 | 2/2020 | Miller et al. | |
| 2020/0371344 A1 | 11/2020 | Eng et al. | |
| 2020/0393687 A1 | 12/2020 | Yabu et al. | |
| 2021/0112647 A1 | 4/2021 | Coleman | |
| 2021/0120659 A1 | 4/2021 | Szilagyi et al. | |
| 2021/0282256 A1 | 9/2021 | Abramenko et al. | |
| 2022/0229307 A1 | 7/2022 | Wang et al. | |
| 2022/0375740 A1 | 11/2022 | Partlow et al. | |
| 2023/0178357 A1 | 6/2023 | Partlow et al. | |
| 2023/0268167 A1* | 8/2023 | Horne ............... | H01J 37/32357 315/111.21 |
| 2023/0319959 A1 | 10/2023 | Partlow | |
| 2023/0420242 A1 | 12/2023 | Partlow et al. | |
| 2024/0194454 A1 | 6/2024 | Smith et al. | |
| 2024/0196506 A1 | 6/2024 | Niell, III et al. | |
| 2024/0297035 A1 | 9/2024 | Partlow et al. | |
| 2024/0401775 A1 | 12/2024 | Wang et al. | |
| 2025/0040004 A1 | 1/2025 | Partlow et al. | |
| 2025/0056705 A1 | 2/2025 | Niel, III et al. | |
| 2025/0069870 A1 | 2/2025 | Horne et al. | |
| 2025/0081319 A1 | 3/2025 | Niel, III et al. | |
| 2025/0102290 A1 | 3/2025 | Wang et al. | |
| 2026/0011981 A1 | 1/2026 | Buch | |

FOREIGN PATENT DOCUMENTS

| | | | |
|---|---|---|---|
| CN | 101989048 | A | 3/2011 |
| CN | 103066491 | A | 4/2013 |
| CN | 210533985 | U | 5/2020 |
| CN | 211315851 | U | 8/2020 |
| CN | 112470069 | A | 3/2021 |
| DE | 19910725 | A1 | 10/1999 |
| DE | 10-2011-113681 | A1 | 3/2013 |
| DE | 10-2019-107924 | A1 | 10/2020 |
| EP | 0151188 | B1 | 11/1991 |
| EP | 1083777 | A9 | 7/2001 |
| EP | 1397030 | A1 | 3/2004 |
| EP | 1313128 | B1 | 5/2011 |
| EP | 2469250 | A2 | 6/2012 |
| EP | 2534672 | B1 | 6/2016 |
| FR | 1471215 | A | 3/1967 |
| FR | 2554302 | A1 | 5/1985 |
| GB | 2266406 | A | 10/1993 |
| JP | S53-103395 | A | 9/1978 |
| JP | S61-193358 | A | 8/1986 |
| JP | S62-222559 | A | 9/1987 |
| JP | H01-296560 | A | 11/1989 |
| JP | H04-144053 | A | 5/1992 |
| JP | H05-61397 | A | 3/1993 |
| JP | H05-82087 | A | 4/1993 |
| JP | H05-82087 | B2 | 11/1993 |
| JP | H08-299951 | A | 11/1996 |
| JP | H09-508755 | A | 9/1997 |
| JP | H09-288995 | A | 11/1997 |
| JP | 2003-317675 | A | 11/2003 |
| JP | 2004-134166 | A | 4/2004 |
| JP | 2004-526188 | A | 8/2004 |
| JP | 2005-522839 | A | 7/2005 |
| JP | 2006-010675 | A | 1/2006 |
| JP | 2006-054270 | A | 2/2006 |
| JP | 2006-080255 | A | 3/2006 |
| JP | 2006-194925 | A | 7/2006 |
| JP | 2007-506947 | A | 3/2007 |
| JP | 2008-506238 | A | 2/2008 |
| JP | 2008-270149 | A | 11/2008 |
| JP | 4255662 | B2 | 4/2009 |
| JP | 2010-087388 | A | 4/2010 |
| JP | 2010-170994 | A | 8/2010 |
| JP | 2010-171159 | A | 8/2010 |
| JP | 2011-023712 | A | 2/2011 |
| JP | 2011-048285 | A | 3/2011 |
| JP | 2011-081274 | A | 4/2011 |
| JP | 2012-018415 | A | 1/2012 |
| JP | 2013-187098 | A | 9/2013 |
| JP | 2015-506106 | A | 2/2015 |
| JP | 2015-519605 | A | 7/2015 |
| JP | 2015-166757 | A | 9/2015 |
| JP | 2016-138989 | A | 8/2016 |
| JP | 2017-220439 | A | 12/2017 |
| JP | 2017-228671 | A | 12/2017 |
| JP | 6243845 | B2 | 12/2017 |
| JP | 2022-519547 | A | 3/2022 |
| KR | 10-2001-0062437 | A | 7/2001 |
| KR | 20050003392 | A | 1/2005 |
| KR | 10-2006-0064319 | A | 6/2006 |
| KR | 10-2006-0087004 | A | 8/2006 |
| KR | 10-2008-0108111 | A | 12/2008 |
| KR | 20100114455 | A | 10/2010 |
| KR | 10-2011-0013226 | A | 2/2011 |
| KR | 10-1269115 | B1 | 5/2013 |
| KR | 10-2016-0071231 | A | 6/2016 |
| KR | 10-1639963 | B1 | 7/2016 |
| KR | 10-2020-0017137 | A | 2/2020 |
| NL | 8403294 | A | 6/1985 |
| RU | 2266628 | C2 | 12/2005 |
| RU | 2278483 | C2 | 6/2006 |
| RU | 2326463 | C2 | 6/2008 |
| RU | 2780202 | C1 | 9/2022 |
| TW | 200610452 | A | 3/2006 |
| WO | 1994/10729 | A1 | 5/1994 |
| WO | 1998/11388 | A1 | 3/1998 |
| WO | 1998/54611 | A2 | 12/1998 |
| WO | 1999/18594 | A1 | 4/1999 |
| WO | 2002/087291 | A2 | 10/2002 |
| WO | 2003/079391 | A2 | 9/2003 |
| WO | 2004/023061 | A2 | 3/2004 |
| WO | 2004/084592 | A2 | 9/2004 |
| WO | 2004/097520 | A2 | 11/2004 |
| WO | 2005/004555 | A1 | 1/2005 |
| WO | 2006/017119 | A2 | 2/2006 |
| WO | 2007/002170 | A2 | 1/2007 |
| WO | 2010/093903 | A2 | 8/2010 |
| WO | 2017/062274 | A1 | 4/2017 |
| WO | 2018/136683 | A1 | 7/2018 |
| WO | 2019/023150 | A1 | 1/2019 |
| WO | 2019/023303 | A1 | 1/2019 |
| WO | 2019/049694 | A1 | 3/2019 |
| WO | 2022/159352 | A2 | 7/2022 |
| WO | 2022/251000 | A1 | 12/2022 |
| WO | 2023/158909 | A1 | 8/2023 |
| WO | 2023/192696 | A1 | 10/2023 |
| WO | 2024/123564 | A1 | 6/2024 |
| WO | 2024/123565 | A1 | 6/2024 |
| WO | 2024/253718 | A1 | 12/2024 |
| WO | 2025/049100 | A1 | 3/2025 |

OTHER PUBLICATIONS

Cesar et al., "High-power fibre lasers", Nature Photonics, vol. 7, 2013, pp. 861-867.

Chang et al., "Fiber Laser Driven EUV Generation", Conference on Lasers and Electro-Optics, 2005, pp. 2200-2202.

(56) References Cited

OTHER PUBLICATIONS

Chen et al., "High-temperature Operation of Periodic Index Separate Confinement Heterostructure Quantum Well Laser", Apll. Phys. Lett., vol. 59, No. 22, 1991, pp. 2784-2786.
Coffey, "Fiber Lasers Achieve World-Record Powers", 2003, pp. 13-14.
Coherent, "Conduction-Cooled Bar Packages (CCPs), 965-985 nm". 2015, pp. 1-4.
Cohn et al., "Magnetic-Field-Dependent Breakdown of CO2-Laser-Produced Plasma", Appl. Phys. Lett., vol. 20, No. 6, 1972, pp. 225-227.
Cooley et al., "Fundamentals of Discharge Initiation in Gas-Fed Pulsed Plasma Thrusters", The 29th International Electric Propulsion Conference, Princeton University, 2005, pp. 1-11.
Cooper, "Spectroscopic Identification of Water-Oxygen and Water-Hydroxyl Complexes and their Importance to Icy Duter Solar System Bodies", Chemistry School of Biomedical and Chemical Sciences, 2004, pp. 1-116.
Cremers et al., "Evaluation of the Continuous Optical Discharge for Spectrochemical Analysis," Spectrochimica Acta, vol. 408, No. 4, 1985, pp. 665-679.
Cross et al., "High Kinetic Energy (1-10eV) Laser Sustained Neutral Atom Beam Source", Nuclear Instruments and Methods in Physics Research B13, 198, pp. 658-662.
Cu-Nguyen et al., "Tunable Confocal Hyperspectral Imaging System", Optical MEMS and Nanophotonics, 2013, pp. 9-10.
Cu-Nguyen et al., "Tunable Hyperchromatic Lens System for Confocal Hyperspectral Sensing", Optics Express, vol. 21, No. 13, 2013, pp. 27611-27621.
Daily et al., "Two-Photon Photoionization of the Ca 4s3d(1)D(2) Level in an Optical Dipole Trap", Physical Review A, vol. 71, 2005, pp. 043406-1-343406-5.
Davis, "Lasers And Electra-Optics: Fundamentals And Engineering", 1996, pp. 1-35.
De Jong et al., "A Pulsed Arc-Glow Hollow Cathode Lamp", Spectroehimlea Acta, vol. 29B, 1974, pp. 179-190.
Demtroder, "Laser Spectroscopy: Basic Concepts And Instrumentation", Second Enlarged Edition, 1982, pp. 395-398.
Derra et al., "UHP Lamp Systems for Projection Applications", J. Phys. D: Appl. Phys. vol. 38, 2005, pp. 2995-3010.
DET25K—GaP Detector, 150-550 nm, 1 ns Rise Time, 4.8 mm2, 8-32 Taps, Thorlabs, 2005, p. 1.
Digonnet, "Rare-Earth-Doped Fiber Lasers And Amplifiers", Optical Engineering, 2001, pp. 144-170.
Diwakar et al., "Role of Laser Pre-Pulse Wavelength and Inter-Pulse Delay on Signal Enhancement in Collinear Double-Pulse Laserlinduced Breakdown Spectroscopy", Spectrochimia Acta, Part B, 2013, pp. 65-73.
Dorsch et al., "Performance and Lifetime of High-Power Diode Lasers and Diode Laser Systems", Proc. SPIE, vol. 3628, 1999, pp. 56-63.
Dorsch et al., 2 KW cw Fiber-coupled Diode Laser System, Proceedings of SPIE vol. 3889, 2000, pp. 45-53.
Durfee III et al., "Development of a Plasma Waveguide for High-Intensity Laser Pulses", Physical Review E, vol. 51, No. 3, 1995, pp. 2368-2389.
Dusterer et al., "Optimization of EUVRradiation Yield from Laser-Produced Plasma", Appl. Phys., B-73, 2001, pp. 693-698.
Eckstrom et al., "Microwave Interactions With Plasmas", IEEE Trans, Plasma Sci. vol. 18, 1992, pp. 1-9 with appendixes.
Edmund Optics, Lens UV-SCX 25MM Dia x 25MM FL Uncoated (Drawing), p. 1.
Eletskii et al., "Formation kinetics and parameters of a photoresonant plasma", Soy. Phys. JETP, vol. 67, No. 5, 1988, pp. 920-924.
Emmett et al., "Direct Measurement of Xenon Flashtube Opacity", Journal of Applied Physics, vol. 35, No. 9, 1964, pp. 2601-2604.
Endo et al., "Laser Produced EUV Light Source Development for HVM", SPIE Advanced Lithography, 2007, pp. 1-25.
Erskine et al., "Measuring Opacity of Shock Generated Argon Plasmas" ,J. Quart Spectro, Radial Transfer, vol. 51, No. 12, 1994, pp. 97-100.
F10T/F1012 and F6 Lightshield Systems Parts Listing, Heraeus Noblelight America LLC, 2015, pp. 1-12.
F300S/F300SQ UV Lamp System Parts Listing, Heraeus Noblelight America LLC, 2015, pp. 1-26.
Feng et al., "A stigmatic Ultraviolet-Visible Monochromator for Use with a High Brightness Laser Driven Plasma Light Source", Review of Scientific Instruments, vol. 84, 2013, pp. 1-6.
Fiedorowicz et al., "X-Ray Emission form Laser-Irradiated Gas Puff Targets," Appl. Phys. Lett., vol. 62, No. 22, May 31, 1993, pp. 2778-2780.
Fomenkov et al., "Laser Produced Plasma Light Source for EUVL",Cymer Inc., 17075 Thommint Court, San Diego, CA 92127, USA, 2011, pp. 1-6.
Franzen, "Continuous Laser-Sustained Plasmas", 1973, J. Appl. Phys., vol. 44, pp. 1727-1732.
Franzen, "CW Gas Breakdown in Argon Using 10.6-µm Laser Radiation," Appl. Phys. Lett., vol. 21, No. 2, Jul. 15, 1972, pp. 62-64.
Frey et al., "Spectroscopy and kinetics of the ionic cesium flouride excimer excited by a Laser-Produced Plasma", Journal of the Optical Society of America B. vol. 6, No. 8, 1989, pp. 1529-1535,.
Fujimoto et al., "High Power InGaAs/AlGaAs laser Diodes with Decoupled Confinement Heterostructure", SPIE vol. 3628, 1999, pp. 38-45.
Galvanauskas, "Fiber laser based EUV lithography sources", Panel discussion presentation at the Sematech EUV Source Workshop, 2007.
Geisler et al., "Spectrometer System Using a Modular Echelle Spectrograph and a Laser-Driven Continuum Source for Simultaneous Multi-Element Determination by Graphite Fumace Absorption Spectrometry", Spectrochimica Acta Part B, vol. 107, 2015, pp. 11-16.
Generalov et al., "Continuous Optical Discharge," ZhETF Pis. Red. 11, No. 9, May 5, 1970, pp. 302-304.
Generalov et al., "Experimental Investigation of a Continuous 1972, pp. 763-769. Optical Discharge," Soviet Physics JETP, vol. 34, No. 4, Apr. 1972, pp. 763-769.
Gentile et al., "Oxidative Decontamination of Tritiated Materials Employing Ozone Gas", PPPL, 2002, pp. 1-9.
Gentile et al., "Tritium Decontamination of TFTR D-T Graphite Tiles Employing Ultra Violet Light and a Nd:YAG Laser", Japan Atomic Energy Research Institute, 1999, p. 321-322.
George et al., "13.5 nm EUV Generation from Tin-doped Droplets Using a Fiber Laser", Optics Express, vol. 15, No. 25, 2007, pp. 16348-16356.
Girard et al., "Generating Conditions of a Laser-Sustained Argon Plasma Jet", J. Phys. D: Appl. Phys., vol. 26, 1993, pp. 1382-1393.
Glangetas, "New Design for a Microwave Discharge Lamp", Rev. Sci. Instrum., vol. 51, No. 3, 1980, pp. 390-391.
Griem, "Plasma Spectroscopy", 1964, pp. 172-176,.
Gullikson et al., "A Soft X-Ray/EUV Reflectometer Based on a Laser Produced Plasma Source", Journal: Journal of X-Ray Science and Technology, vol. 3, No. 4, 1992, pp. 283-299.
Prabhu et al., "High-Power CW Raman Fiber Laser Using Phosphosilicate Fiber Pumped by Yb-doped Double-clad Fiber Laser", XIII International Symposium on Gas Flow and Chemical Lasers and High-Power Laser Conference, Proceedings of SPIE vol. 4184, 2001, pp. 482-485.
Waynant et al., "Electro-Optics Handbook", Eds., 2002, pp. 1-1000.
Topanga Advanced Plasma Lighting APL400-4000BF, p. 1.
Topanga Advanced Plasma Lighting APL400-4000SF, p. 1.
Topanga Advanced Plasma Lighting APL400-5500BF, p. 1,.
Topanga Advanced Plasma Lighting APL400-5500SF, p. 1.
Topanga's Advanced Plasma Lighting System, Topanga USA, 2016, pp. 1-5.
Treshchalov et al., "Spectroscopic Diagnostics of Pulsed Discharge in High-Pressure Argon", Quantum Electrics, vol. 40. No. 3, 2010, pp. 234-240.
Tsuboi et al., "Nanosecond Imaging Study on Laser Ablation of Liquid Benzene", Appl. Phys. Lett, vol. 64, 1994, pp. 2745-2747.

(56) References Cited

OTHER PUBLICATIONS

Uhlenbusch, et al., "Hβ-Line Profile Measurements in Optical Discharges", J. Quant. Spectrosc. Radiat. Transfer vol. 44, No. 1, 1990, pp. 47-56.
User Manual: Cyberlight, Cyberlight Cx. Cyberlight Sv (Version 2.0), High End Systems, Inc., (1996).
Ushio Super-High Pressure Mercury Lamps, including USH-102D, USH-102DH, USH-205DP, USH-2055, USH-206D/M4, USH-250D, USH-250BY, USH-350DS, USH-351DS, USH-350DP, USH-450G5, USH-450GL, USH-500BY, USH-500MB, USH-502MB, USH-500T, USH-505MC,USH-5085, USH-508SA, USH-5095, USH-1000DW, USH-1000MC, USH-1000KS, USH-1002DW, Ushio.
Vadla et al., "Resonantly Laser Induced Plasmas in Gases: The Role of Energy Pooling and Exothermic Collisions in Plasma Breakdown and Heating", Spectrochimica Acta Part B, vol. 65, 2010, pp. 33-45.
Vampola, "P78-2 Engineering Overview", Defence Technical Information Centre, 1981, pp. 1-36.
Vukanovic et al., "A New Type of D.C. Arc as Spectrochemical Light Source", Spectrochimica Acta, vol. 298, 1974, pp. 33-36.
Wang, "Self-Assembled Indium Arsenide Quantum-Dash Lasers of Indium Phosphide Substrates", Electrical and Computer Engineering, 2002, pp. vi-150.
Waynant et al., "Electro-Optics Handbook", Eds., 20002, pp. 1-1000.
Webb et al., Handbook Of Laser Technology And Applications, Applications, vol. III, 2004, pp. 1587-1611.
Wei, "Transparent Ceramic Lamp Envelope Materials", J. Phys. D: Appl. Phys., vol. 38, 2005, pp. 3057-3065.
Weinrotter et al., "Application of Laser Ignition to Hydrogen-Air Mixtures at High Pressures", International Journal of Hydrogen Energy, vol. 30, 2005, pp. 319-326.
Weinrotter et al., "Laser Ignition of Engines", Laser Physics, vol. 15, No. 7,2005, pp. 947-953.
Wiehle et al., "Dynamics of Strong-Field Above-Threshold Ionization of Argon: Comparison Between Experiment and Theory", Physical Review A, vol. 67, 2003, pp. 063405-1-063405-7.
Wieman et al., "Using Diode Lasers for Atomic Physics", Rev. Sci. Instrum., vol. 62, No. 1, 1991, pp. 1-20.
Wilbers et al.. "The Continuum Emission of an Arc Plasma," J. Quant. Spectrosc. Radiat, Transfer, vol. 45, No. 1, 1991, pp. 1-10.
Wilbers et al., "The VUV Emissivity of a High-Pressure Cascade Argon Arc from 125 to 200 nm," J. Quant. Spectrosc. Radiat. Transfer, vol. 46, 1991, pp. 299-308.
Winter et al., "Experimental and Theoretical Investigations of a Helium-Xenon Discharge in Spot Mode", 28th ICGQP. 2007, pp. 1979-1982.
Wood, "Atomic Processes: Bound-bound transitions (Einstein coefficients)", available at http://www-star.st-and.ac.uk-kw25/teaching/nebulae/lecture06_einstein.pdf. 2014, pp. 1-10.
World Record Powers Achieved in Single-Mode Fiber Lasers—Powers Scalable to IkW and Beyond, Southampton Photonics, Inc., 2003, pp. 1-2.
Wroblewski et al., "An Experimental Investigation of the Continuous Optical Discharge", Journal of Physique, 1979, pp. 733-734.
Wu et al., "Extreme Ultraviolet Lithography: Towards the Next Generation of Integrated Circuits", vol. 7, 2009, pp. 1-4 (2009).
Xenakis et al., "Laser-plasma X-ray Generation Using an Injection-mode-locked XeCI Excimer Laser", J. Appl. Phys., vol. 71, No. 1, 1992, pp. 85-93.
Xu et al., "Wavelength- and Time-Resolved Investigation of Laser-Induced Plasmas as a Continuum Source", Applied Spectroscopy, vol. 47, No. 8, 1993, pp. 1134-1139.
Yamada et al., "Ionization Mechanism of Cesium Plasma Produced by Irradiation of Dye Laser", 1992,Jpn. J. Appl. Phys. vol. 31, pp. 377-380.
Yamakoshi et al., "Extreme-Ultraviolet Laser Photo-Pumped by a Self-Healing Hg Target", SPIE, Vo . . . 2015, 1994, pp. 227-231.
Yamanaka, "Inertial Confinement Fusion Research at ILE Osaka", Nuclear Fusion, vol. 25, No. 9, 1985, pp. 1343-1349.
Yoshino et al., "Absorption Spectrum of Xenon in the Vacuum-Ultraviolet Region",J. Opt. Soc. Am. B/vol. 2, No. 8, 1985, pp. 1268-1274.
Yoshizawa et al., "Disk-shaped Vacuum Ultraviolet Light Source Driven by Microwave Discharge for Photoexcited Processes", Appl. Physc. Lett., vol. 559, 1991, pp. 1678-1680.
Yusim et al., "100 Watt, single-mode, CW, Linearly Polarized All-fiber Format 1.56um Laser with Suppression of Parasitic Lasing Effects", Proceedings of SPIE, vol. 6709, 2005, pp. 69-77.
Zajac et al., "10 W cw Nd-Doped Double-clad Fiber Laser Operating at 1.06 μm", Proceedings of SPIE vol. 5036, 2003, pp. 135-138.
International Search Report and Written Opinion received for corresponding PCT Patent Application No. PCT/US2023/081409, mailed on Mar. 29, 2024, 15 pages.
Measures et al., "Fast and Efficient Plasma Heating Through Superelastic Laser Energy Conversion", J. Appl. Phys., vol. 51, No. 7, 1980, pp. 3622-3628.
Measures et al., "Laser interaction based on resonance saturation (LIBORS): an alternative to inverse bremsstrahlung for coupling laser energy into a plasma", 1979, Applied Optics, vol. 18, No. 11, pp. 1824-1827.
Measures et al., "TABLASER: Trace (Element) Analyzer Based on Laser Ablation and Selectively Excited Radiation", Applied Optics, vol. 18, No. 3, 1979, pp. 281-286 (1979).
Measures, "Electron Density and Temperature Elevation of a Potassium Seeded Plasma by Laser Resonance Pumping",J. Quant. Spectrose. Radial. Transfer. vol. 10, 1970, pp. 107-125.
Mercury Vapor Light Source, Model OS-9286A.
Michel et al., "Analysis of Laser-Induced Breakdown Spectroscopy Spectra: The Case for Extreme Value Statistics", Spectrochimica Acta Part B, vol. 62, 2007, pp. 1370-1378.
Michel et al., "Laser-Induced Breakdown Spectroscopy of Bulk Aqueous Solutions at Oceanic Pressures: Evaluation of Key Measurement Parameters", Applied Optics, vol. 46, No. 13, 2007, pp. 2507-2515.
Milian et al., "Dynamic Compensation of Chromatic Aberration in a Programmable Diffractive Lens", Optical Express, vol. 14, No. 20, 2006, pp. 9103-9112.
Millard et al., "Diode Laser Absorption Measurements of Metastable Helium in Glow Discharges", Plasma Sources Sci. Technol., vol. 7, 1998, pp. 288-394.
Mills et al., "Argon-Hydrogen-Strontium Discharge Light Source", IEEE Transactions On Plasma Science, vol. 30, No. 2, 2002, pp. 639-652.
Mills et al., "Excessively Bright Hydrogen-Strontium Discharge Light Source Due to Energy Resonance of Strontium with Hydrogen", J. Plasma Physics, vol. 69, Part 2, 2003, pp. 131-158.
Mizoguchi et al., "Development of Light Source for Lithography at Present and for the Future", vol. 59, No. 166, 2013, pp. 1-7.
Mizoguchi et al., Development of CO2 Laser Produced Xe Plasma EUV Light Source for Microlithography, Proc. Of SPIE, vol. 6151, 2006, pp. 61510S-1.
Mobarhan, "Test and Characterization of Laser Diodes: Determination of Principal Parameters", 1999, pp. 1-7.
Moody, "Maintenance of a Gas Breakdown in Argon Using 10.6-μ cw Radiation", Journal of Applied Physics, vol. 46, No. 6, Jun. 1975, pp. 2475-2482.
Mora, "Theoretical Model of Absorption of Laser Light by a Plasma", Phys. Fluids, vol. 25, No. 6, 1982, pp. 1051-1056.
Mordovanakis et al., "Demonstration of Fiber-laser-produced Plasma Source and Application to Efficient Extreme UV Light Generation", Optics Letter, vol. 31, No. 17, 2006, pp. 2517-2519.
Mosier-Boss et al., "Field Demonstrations of a Direct Push FO-LIBS Metal Sensor", Environ. Sci. Technol., vol. 36, 2002, pp. 3968-3976.
Mosier-Boss et al., "Detection of Lead Derived from Automotive Scrap Residue Using a Direct Push Fiber-Optic Laser-Induced Breakdown Spectroscopy Metal Sensor", Applied Spectroscopy, vol. 59, No. 12, 2005, pp. 1445-1456.

(56) References Cited

OTHER PUBLICATIONS

Motomura et al., "Temporal VUV Emission Characteristics Related to Generations and Losses of Metastable Atoms in Xenon Pulsed Barrier Discharge", J. Light & Vis. Env, vol. 30, No. 2, 2006, pp. 81-86.
Moulton, "Tunable Solid-State Lasers", Proceedings of the IEEE, vol. 80, No. 3, 1992, pp. 348-364.
Muller et al., "Theoretical Model for a Continuous Optical Discharge", Physica, 112C, 1982, pp. 259-270.
Nagano et al., "Present Status of Laser-Produced Plasma EUV Light Source", Proc. Of SPIE, vol. 7636, 2010, pp. 76363C-1-76363C-9.
Nakar et al., "Radiometric Characterization of Ultrahigh Radiance Xenon Short-Arc Discharge Lamps, Ben-Gurion University", Applied Optice, vol. 47,No. 2, Jan. 9, 2008.
Neukum, "Vom Halbleiterchip zum Laserwerkzeug", 2007, pp. 18-20.
Nikitin et al., "Guiding of Intense Femtosecond Pulses in Preformed Plasma Channels", Optics Letter, vol. 22, No. 23, 1997, pp. 1787-1789.
Norimatsu et al., "Cryostat to Provide a Solid Deuterium Layer in a Plastic Shell for the Gekko XII Glass Laser System", Review Of Scientific Instruments, vol. 63, No. 6, 1992, pp. 3378-3383.
OEM Compact Fiber Laser module 1090nm 10-20W Cw/M With GTWave Technology, SPI Lasers LLC.
Oettinger et al., Plasma Ionization Enhancement by Laser Line Radiation, AIAA Journal, vol. 8, No. 5, 1970, pp. 880-885.
Orth et al., "High-Resolution Spectra of Laser Plasma Light Sources in the Normal Incidence XUV Region", Applied Optics, vol. 25, No. 13, 1986, pp. 2215-2217.
OSRAM Opto Semiconductors Announces New Solutions for Laser Applications; New Offerings Provide High Output and Enhanced Reliability, Business Wire, Jun. 28, 2005, pp. 1-3.
Oxford Dictionary of Astronomy, definition of bound-bound transition, 2003, p. 59.
Pankert et al., "EUV Sources for the Alpha-Tools", Proc. Of SPIE, vol. 6151, 2006, pp. 1-9.
Pappas et al., "Formation of a Cesium Plasma by Continuous-Wave Resonance Excitation", Applied Spectroscopy, vol. 54, No. 8, 2000, pp. 1245-1249.
Parker, "McGraw-Hill Dictionary of Scientific and Technical Terms",5th Edition, 1994, 561 Pages.
Patel et al., "The Suitability of Sapphire for Laser Windows", Meas. Sci. Technol., vol. 10, 1999, pp. 146-151.
Pebler et al., "Stabilizing the Radiant Flux of a Xenon Arc Lamp", Applied Optice, vol. 20, No. 23, 1981, pp. 4059-4061.
Perry, "Solar Thermal Propulsion: An Investigation Of Solar Radiation Absorption In A Working Fluid", 1984 pp. 1-70.
Petring et al., "High Power Diode Lasers", Technology and Applications, 2007, pp. 285-533.
Phillip, "Optical Properties of Non-Crystalline Si, SiO, SiOx and SiO2", J. Phys. Chem. Solids, vol. 32, 1971, pp. 1935-1945.
Phillip, "Optical Transitions in Crystalline and Fused Quartz", Solid State Communications vol. 4, 1966, pp. 73-75.
Phillips et al., "Characterization and Stabilization of Fiber-Coupled Laser Diode Arrays", Review Of Scientific Instruments, vol. 70, No. 7, 1999, pp. 2905-2909.
Plyler et al., "Precise Measurement of Wavelengths in Infrared Spectra", Journal of Research of the National Bureau of Standards, vol. 55, No. 5, 1955, pp. 279-284.
Polijanczuk et al., "Semiconductor Lasers for Microsoldering", 1991, pp. 6/1-6/4.
Prabhu et al., "High-Power CW Raman Fiber Laser Using Phosphosilicate Fiber Pumped by Yb-doped Double-clad Fiber Laser", IEE Colloquium on Advances in Interconnection Technology, 2001, pp. 482-485.
Raizer, "Continuous Optical Discharge: Generation and Support of Dense Low-Temperature Plasma by Laser Irradiation", 1996, pp. 87-94.
Raizer, "Gas Discharge Physics", 1991, pp. 1-449.
Raizer, "Optical Discharges," Sov. Phys. Usp., vol. 23, No. 11, 1980, pp. 789-806.
Reisman et al., "Inductively coupled plasma light source driven by an all solid-state pulsed power system", Applied Physics Letters, vol. 123, Issue 18, Nov. 2, 2023, 6 pages. [retrieved on Oct. 17, 2024], Retrieved from <https://doi.org/10.1063/5.0174510>.
Rhemet, "Xenon Lamps", IEE Proc., vol. 127, Pt. A, No. 3, 1980, pp. 190-195.
Kolb et al., "Low Optical Loss Synthetic Quartz", Mat. Res. Bull. vol. 7, 1972, pp. 397-406.
Kondow et al., "Temperature Dependence of Lasing Wavelength in a GainNAs Laser Diode", IEEE Photonics Technology Letters, vol. 12, No. 7, 2000, pp. 777-779.
Kopecek et al., "Laser Ignition of Methane-Air Mixtures at High Pressures and Diagnostics", Journal of Engineering for Gas Turbines and Power, vol. 127, 2005, pp. 213-219.
Kopecek et al., "Laser-Induced Ignition of Methane-Air Mixtures at Pressures up to 4 MPa", Laser Physics, vol. 13, No. 11, 2003, pp. 1365-1369.
Korn et al., "Ultrashort 1-kHz Laser Plasma Hard X-ray Source", Optics Letters, vol. 27, No. 10, 2002, pp. 866-868.
Kozlov et al., "Radiative Losses by Argon Plasma and the Emissive Model of a Continuous Optical Discharge", Soy. Phys. JETP, vol. 39, No. 3, Sep. 1974, pp. 463-468.
Kozlov et al., "Sustained Optical Discharges in Molecular Gases," Sov. Phys. Tech. Phys. vol. 49, No. 11, Nov. 1979, pp. 1283-1287.
Kranzusch et al., "Spatial Characterization of Extreme Ultraviolet Plasmas Generated by Laser Excitation of Xenon Gas Targets", Review of Scientific Instruments, vol. 74, No. 2, 2003, pp. 969-974.
Krushelnick et al., "Plasma Channel Formation and Guiding during High Intensity Short Pulse Laser Plasma Experiments", Physical Review Letters, vol. 78, No. 21, 1997, pp. 4047-4050.
Ku et al., "Decay of Krypton 1(s)(2) and 1(s)(3) Excited Species in the Late Afterglow", Physical Review A, vol. 8, No. 6, 1973, pp. 3123-3130.
Kubiak et al., "Scale-up of a Cluster Jet Laser Plasma Source for Extreme Ultraviolet Lithography", SPIE, vol. 3676, 1999, pp. 669-678.
Kuhn, "Laser Engineering", 1998, pp. 303-343, 365-377, 384-440.
Kurkov et al., "CW Medium-Power Fiber Lasers for Near IR Range", Proceedings of SPIE, vol. 5449, 2004, pp. 62-69.
Lackner et al., "The Optical Spark Plug: Window-related Issues", Institute of Chemical Engineering, Vienna University of Technology, 2005, pp. 1-6.
Lange et al., "Tunable Diode Laser Absorption Spectroscopy for Plasmas at Elevated Pressures", Proceedings of SPIE Vo. 4460, 2002, pp. 177-187.
Laufer et al., "Effect of Temperature on the Vacuum Ultraviolet Transmittance of Lithium Fluoride, Calcium Fluoride, Barium Fluoride, and Sapphire", Journal of The Optical Society of America, vol. 55, No. 1, 1965, pp. 64-66.
Laufer, "Introduction To Optics And Lasers In Engineering", 1996, pp. 449-454.
Legall et al., "Spatial and Spectral Characterization of a Laser Produced Plasma Source for Extreme Ultraviolet Metrology", Review of Scientific Instruments, vol. 75, No. 11, 2004, pp. 4981-4988.
Lenses and Curved Mirrors, University of Delaware, Imaging (last visited Dec. 19, 2015). pp. 24-29.
Leonov et al.. "Mechanisms of Resonant Laser Ionization", JETP, vol. 8, No. 4, 1997, pp. 703-715.
Lewis et al., "Measurements of CW Photoionization for the Use in Stable High Pressure Tea Laser Discharge", IEEE Nuclear and Plasma Sciences Society, 1975, pp. 14-45.
Li et al., "Density measurements of a high-density pulsed gas jet for laser-plasma interaction studies", Meas. Sci. Technol., vol. 5, 1994, pp. 1197-1201.
Li, "The Advances and Characteristics of High-Power Diode Laser Materials Processing", Optics and Lasers in Engineering. vol. 34, 2000, pp. 231-253.
Liao et al., "An efficient Ni Kα X-ray Source Driven by a High Energy Fiber CPA System", Center for Ultrafast Optical Science, 2007, pp. CP1-4-THU.

(56) References Cited

OTHER PUBLICATIONS

Liao et al., "Generation of Hard X-rays Using an Ultrafast Fiber Laser System", Optics Express, vol. 15, No. 21, 2007, pp. 13942-13948.
Light Hammer, 10 Mark II UV Lamp System, Heraeus Noblelight America LLC. 2015, pp. 1-20.
Light Hammer, 6 UV Lamp System Parts Listing, Heraeus Noblelight America LLC, 2015, pp. 1-22.
Lo et al., "Resonance-Enhanced LIBS", Department of Physics, 2002, pp. 15-17.
Lowe et al., "Developments in Light Sources and Detectors for Atomic Absorption Spectroscopy", Spectrochimica Acta Part B., vol. 54, 1999, pp. 2031-2039.
Lui et al., "Resonance-Enhanced Laser-Induced Plasma Spectroscopy: Time-Resolved Studies and Ambient Gas Effects", Department of Physics, 2002, pp. 19-21.
Luo et al., "Sapphire (0 0 0 1) Surface Modifications Induced by Long-Pulse 1054 nm Laser Irradiation", Applied Surface Science, vol. 253, 2007, pp. 9457-9466.
Macdowell et al., "Reduction imaging with soft x rays for projection lithography", Review Of Scientific Instruments, vol. 63, No. 1, 1992, pp. 737-740.
Maclean et al., "Direct Diode Laser Pumping of a Ti:Sapphire Laser", Institute of Photonics, SUPA, 2009, pp. 1-3.
Magner et al., "Self-Compression of Ultrashort Pulses through Ionization-Induced Spatiotemporal Reshaping", Physical Review Letter, vol. 93, No. 17. 2004, pp. 173902-1-173902-4.
Mahmoud et al., "Ion Formation in Laser-Irradiated Cesium Vapor", Journal of Quantitative Spectroscopy & Radiative Transfer, vol. 102, 2006, pp. 241-250.
Malik et al., "Spectroscopic Measurements on Xenon Plasma in a Hollow Cathode", 2000, J. Phys. D: Appl. Phys., vol. 33, pp. 2037-2048.
Malka et al., "Channel Formation in Long Laser Pulse Interaction with a Helium Gas Jet", Physical Review Letters, vol. 79, No. 16, 1997, pp. 2979-2982.
Mandel 'Shtam et al., "Investigation of the Spark Discharge Produced in Air by Focusing Laser Radiation II", Soviet Physics JETP, vol. 22, No. 1, 1966, pp. 91-96.
May, "Infrared Optogalvanic Effects in Xenon", Optics Communications, vol. 64, No. 1, 1987, pp. 36-40.
Mazumder et al., "Spectroscopic Studies of Plasma During CW Laser Gas Heating in Flowing Argon", J. Appl. Phys .. vol. 62, No. 12, 1987, pp. 4712-4718.
Richardson et al., "High Conversion Efficiency Mass-Limited Sn-Based Laser Plasma Source for Extreme Ultraviolet Lithography", J. Vac. Sci. Technol. B., vol. 22, No. 2, 2004, pp. 785-790.
Rietdorf et al., "Special Optical Elements", J. (eds) Handbook Of Biological Confocal Microscopy, 2006, pp. 43-58.
Rockstroh et al., "Spectroscopic Studies of Plasma During CW Laser Materials Interaction", J. Appl. Phys., vol. 61, No. 3, 1987, pp. 917-922.
Roth et al., "Directly Diode-laser-pumped Ti:sapphire laser",Optics Letters, vol. 34, No. 21, 2009, pp. 3334-3336.
Sacchi, "Laser-Induced Electric Breakdown in Water", J. Opt. Soc. Am. B, vol. 28, No. 2, 1991, pp. 337-345.
Sakamoto et al., "120W Cw Output Power from Monolithic AlGaAs (800nm) Laser Diode Array Mounted on Diamond Fleatsink", Electronic Letter, vol. 28, No. 2, 1992, pp. 197-199.
Saloman, "Energy Levels and Observed Spectral Lines of Xenon, Xe(I) through Xe(LIV)", J. Phys. Chem. Ref. Data, vol. 33, No. 3, 2004, pp. 765-921.
Saraswat et al., "Single Wafer Rapid Thermal Multiprocessing", Mat. Res. Soc. Symp. Proc. vol. 146, 1989, pp. 3-13.
Schohl et al., "Absolute Detection of Metastable Rare Gas Atoms by a CW Laser Photoionization Method", Z. Phys. D—Atoms, Molecules and Clusters, vol. 21, 1991, pp. 25-39.
Sereda et al., "High-power IR Lasers Operating on Xe I Transitions", Quantum Electron, vol. 23, No. 6, 1993, pp. 459-480.
Shaw et al.. "Preliminary Design of Laser-Induced Breakdown Spectroscopy for Proto-Material Plasma Exposure Experiment", Review Of Scientific Instruments, vol. 85, 2014, pp. 11D806-1-11D806-3.
Shen et al., "Highly Efficient Er, Yb-Doped Fiber Laser with 188W Free-Running and >100W Tunable Output Power", Optics Express, vol. 13, No. 13, 2005, pp. 4916-4921.
Shigeyoshi et al., "Near Infrared Absorptions of Neon, Argon, Krypton, and Xenon Excited Diatomic Molecules", J. Chem. Phys., vol. 68, 1978, pp. 7595-4603.
Shimada et al., "Characterization of Extreme Ultraviolet Emission from Laser-Produced Spherical Tin Plasm Generated with Multiple Laser Beams", Applied Physics Letters, vol. 86, 2005, pp. 051501-1-051501-3.
Shirakawa et al., "CW 7-W, 900-nm-wide Supercontinuum Source by Phosphosilicate Fiber Raman Laser and Highnonlinear Fiber", Proceedings of SPIE, vol. 5709, 2005, pp. 199-205.
Sidawi, "Fiber Lasers Gain Power", www.rdmag.com, 2003, 26 Pages.
Silfvast et al., "Comparison of Radiation from Laser-Produced and DC-Heated Plasmas in Xenon", Applied Physics Letters, vol. 25, No. 5, 1974, pp. 274-277.
Silfvast, Laser Fundamentals, Schhol of Optics, 2004, pp. 1-6, pp. 199-222 & 565-68.
Skenderovic et al., "Laser-ignited glow discharge in lithium vapor", Physical Review A, vol. 62, 2000, pp. 052707-1-052707-7.
Smith, "Gas-Breakdown Dependence on Beam Size and Pulse Duration with 10.6-μWavelength Radiation", Applied Physics Letters, vol. 19, No. 10, 1971, pp. 405-408.
Snyder et al., "Laser-Induced Breakdown Spectroscopy of High-Pressure Bulk Aqueous Solutions", Applied Spectroscopy, vol. 60, No. 7, 2006, pp. 786-790.
Sobota et al., "The Role of Metastables in the Formation of an Argon Discharge in a Two-Pin Geometry", IEEE Transactions on Plasma Science, vol. 38, No. 9, 2010, pp. 2289-2299.
Song et al., "Mechanisms of Absorption in Pulsed Excimer Laser-Induced Plasma", Appl. Phys. A, vol. 65, 1997, pp. 477-485.
Stamm, "Extreme Ultraviolet Light Sources for use in Semiconductor Lithography—State of the Art and Future Development", J. Phys. D: Appl. Phys., vol. 37, 2004, pp. 3244-3253.
Stulen et al., "Developing A Soft X-Ray Projection Lithography Tool", AT & T Technical Journal, 1991, pp. 37-48.
Su et al., "Note: A Transient Absorption Spectrometer Using an Ultra Bright Laser-Driven Light Source", Review Of Scientific Instruments, vol. 84, 2013, pp. 086106-1-386106-3.
Sundvold et al., "Optical Firing System", Proc. Of SPIE, vol. 5871, 2005, pp. 587104-1-587104-10.
Super-Quiet Xenon Lamp Super-Quiet Mercury-Xenon Lamp, Hamamatsu Product Information, Nov. 2005, 16 pages.
Surzhikov, "Numerical Simulation of Subsonic Gasdynamical Instabilities Near Heat Release Regions", AIAA, 1996, pp. 1-11.
Swiderski et al., Q-switched Nd-doped double-clad fiber laser, Opto Electronics Review, vol. 13, No. 3, 2005, pp. 187-192.
Szymanski et al., "Nonstationary Laser-Sustained Plasma", Joumal of Applied Physics, vol. 69, No. 6, 1990, pp. 3480-3484.
Szymanski et al., "Spectroscopic Study of a Supersonic Jet of Laser-Heated Argon Plasma", J. Phys. D: Appl. Phys., vol. 30, 1997, pp. 998-1006.
Takahashi et al., "Numerical Analysis of Ar(2) Excimer Production in Laser-Produced Plasmas". Journal of Applied Physics, 1998, pp. 390-393.
Takahashi et al., "Ar(2) Excimer Emission from a Laser-Heated Plasma in a High-Pressure Argon Gas", Applied Physics Letters, vol. 77, No. 5, 2000, pp. 4115-4117.
Tam et al., "Plasma Production In a Cs Vapor by a Weak cw Laser Beam at 6010 A, Optics Communications", vol. 21, No. 3, 1977, pp. 403-407.
Tam, "Dynamic Response of a cw Laser-produced Cs Plasma to Laser Modulations", Appl. Phys. Lett., vol. 35, No. 9, 1979, pp. 683-685.
Tam, "Quasiresonant Laser-Produced Plasma: An Efficient Mechanism for Localized Breakdown", J. Appl. Phys., vol. 51, No. 9, 1980, pp. 4682-4687.

(56) References Cited

OTHER PUBLICATIONS

Tanaka et al., "Production of Laser-Heated Plasma in High-Pressure Ar Gas and Emission Characteristics of Vacuum Ultraviolet Radiation from Ar(2) Excimers", Appl. Phys. B, vol. 74, 2002, pp. 323-326.
Tansu, "Novel Quantum-Wells GaAs-Based Lasers for All Transmission Windows in Optical Communication", 2003, pp. i-291.
Theriault et al., "A Real-Time Fiber-Optic LIBS Probe for the In Situ Delineation of Metals in Soils", Field Analytical Chemistry and Technology, vol. 2, No. 2, 1998, pp. 117-125.
Theriault et al., "Field Deployment of a LIBS Probe for Rapid Delineation of Metals in Soils", SPIE, vol. 2835, 1996, pp. 83-88.
Thermoelectric Cooler Controller, Analog Devices Inc., 2002, pp. 1-24.
Tichenor et al., "Soft-x-ray projection lithography experiments using Schwarzschild imaging optics", Applied Optics, vol. 32, No. 34, 1993, pp. 7068-7071.
Tombelaine, et al. "Spectrally Shaped Light From Supercontinuum Fiber Light Sources", Optics Communications, vol. 284, Issue 7, Apr. 1, 2011, pp. 1970-1974.
Tooman, "The Sandia Laser Plasma Extreme Ultraviolet and Soft X-ray (XUV) Light Source", SPIE vol. 664, 1986, pp. 186-191.
Topanga Advanced Plasma Lighting APL 1000-4000SF, p. 1.
Topanga Advanced Plasma Lighting APL1000-5000SF, p. 1.
Topanga Advanced Plasma Lighting APL250-4000BF, p. 1.
Topanga Advanced Plasma Lighting APL250-4000SF, p. 1.
Topanga Advanced Plasma Lighting APL250-5500SF, p. 1.
Office Action Received for Taiwan Patent Application No. 112147346, mailed on Jan. 7, 2026, 25 pages including 11 pages of English Translation.
Abe et al., "KrF Laser Driven Xenon Plasma Light Source of a Small Field Exposure Tool", Proc. of SPIE, vol. 6151, 2006, pp. 61513T-1-61513T-5.
Agrawal et al., "Infrared and Visible Semiconductor Lasers", 1993, pp. xiii-616.
Agrawal et al., "Semiconductor Lasers", Second edition, 1993, pp. 547.
Ahmed et al., "Laser Optogalvanic Spectroscopic Studies of Xenon", J. Phys. B: At. Mol. Opt. Phys. 31, 1998, pp. 4017-4028.
Aitoumeziane et al., "Theoretical and Numerical Study of the Interaction of a Nanosecond Laser Pulse with a Copper Target for Laser-Induced Breakdown Spectroscopy Applications", J. Opt. Soc. Am. B, vol. 31, No. 1, 2014, pp. 53-61.
Al-Muhanna et al., High-Power (>10 W) Continuous-Wave Operation from 100-um-Aperture 0.97-um-emitting Al-Free Diode Lasers, Applied Physics Letters, vol. 73, No. 9, Aug. 31, 1998, pp. 1182-1184.
Angel, "LIBS Using Dual-Laser Pulses", 2002, p. 14.
Anonynaous: "Tomidai Msrrors TRseries:Shimadzu Corporatson",Oct. 27, 2020, XP093222739, 7 pages. Retrieved from the Internet:URL:https://web.archive.org/webs/20201027085809/https://shimadzu.com/opt/products/aspherical/o-k25cur0000007p3b.html.
Apter, "High-power Diode Lasers Offer Efficient Answer, Product Guide", 2005, pp. 1-3.
Aragon et al., "Determination of Carbon Content in Molten Steel Using Laser-Induced Breakdown Spectroscopy", 1993, pp. 306-608.
Arieli, Excitation of Gas Laser by Optical Pumping, Chapter 6.1, Gas Laser, 2006, p. 2b.
Arp et al., "Argon Mini-Arc Meets its Match: Use of a Laser-Driven Plasma Source in Ultraviolet-Detector Calibrations", Applied Optics vol. 53, Issue 6 , 2014, pp. 1089-1093.
Arp et al., "Feasibility of Generating a Useful Laser-Induced Breakdown Spectroscopy Plasma on Rocks at High Pressure: reliminary Study for a Venus Mission", Spectrochimica Acta Part B 59, 2004, pp. 987-999.
Arzuov et al., "Self-Maintenance of a Continuous Optical Discharge in Gases Near Solid Targets", Soy. J. Quant. Electron., vol. 5, No. 5, 1975, pp. 523-525.
Azuma et al., "Debris from Tape-Target Irradiated with Pulsed YAG Laser", Applied Surface Science, 2002, pp. 224-228.
B 11 3mmaxoe, 011THLIECKHE PA3PFIRb1,110flREPK4BAEMbIE I4311YLIEHMEM J1A3EPOB Efill)KHEI-0 ilk-.I4- EIA11A3OHA Ommixo-xmknyeckasi Kmue-rma B ra3ouoii gmuamme, www.chemphys.edu.ru/pdf/2014-11-29-001.pdf.
B.B. Kostin, I4311YLIEH14EF1J1A3MbI, HAIPETOC4 KOPOTKI4MI4 11A3EPHb1MI4 14M11YIIbCAM14 23(2) 014314KA EffIA3MbI 118 (1997).
B.T. Apxpinkmu and A. K. Dona HEIII4HEOHAFI 011T14KA I4 11PEOBPA3OBAHHE CBETA B IA3AX 153(3) YaIEXI4 IM3144ECK14X HAYK 423 (1987).
Babucke et al., "On the Energy Balance in the Core of Electrode-Stabilized High-Pressure Mercury Discharges", J. Phys. D: Appl. Phys. vol. 24, 1991, pp. 1316-1321.
Bachmann, "Goals and status of the German national research initiative BRIOLAS (brilliant diode lasers)",Proc. of SPIE vol. 6456, 2007, pp. 645608-1.
Bachmann, "Industrial Applications of High Power Diode Lasers in Materials Processing", Applied Surface Science, 208-209, 2003, pp. 125-136.
Baer, "Plasma Diagnostics With Semiconductor Lasers Using Fluorescence and Absorption Spectroscopy", Stanford University ProQuest Dissertations Publishing, 1993, pp. 1-194.
Ball, "Raman Spectroscopy", vol. 17, No. 2, 2002, pp. 50-52.
Ballard et al., "High-Power, Laser-Produced-Plasma EUV Source",Proc. SPiE, vol. 4688, 2002, pp. 302-309.
Ballman et al., "Synthetic Quartz with High Ultraviolet Transmission", Applied Optics, vol. 7, No. 7, 1968, pp. 1387-1390.
Barnes et al., "Argon Arc Lamps", Applied Optics, vol. 24, No. 13, 1985, pp. 1947-1949.
Barnes et al., "High Power Diode Laser Cladding", Journal of Materials Processing Technology, vol. 138, 2003, pp. 411-416.
Bartz et al., "Optical Reflectivity Measurements Using a Laser Plasma Light Source", Appl. Phys. Lett. vol. 55, No. 19, 1989, pp. 1955-1957.
Bataller et al., "Nanosecond High-Power Dense Microplasma Switch for Visible Light",Applied Physics Letters, vol. 105, 2014, pp. 1-5.
Bauder, "Radiation from High-Pressure Plasmas", Journal of Applied Physics, vol. 39, No. 1, 1968, pp. 148-152.
Beam Samplers; UV Fused Silica Beam Samplers, (AR Coating: 250-420 nm) (AR Coating: 350-700 nm) (AR Coating: 550-1050 nm) (AR Coating: 1050-1700 nm), 3 pages.
Beck, "Simple Pulse Generator for Pulsing Xenon Arcs with High Repetition Rate," Rev. Sci. Instrum., vol. 45, No. 2, Feb. 1974, pp. 318-319.
Belasri et al., "Electrical Approach of Homogenous High Pressure NeIXe/CHI Dielectric Barrier Discharge for XeCl (308 nm) Lamp", Plasma Chem Plasma Process, vol. 31, 2011, pp. 787-798.
Bloch et al., "Field Test of a Novel Microlaser-Based Probe for in Situ Fluorescence Sensing of Soil Contamination", Applied Spectroscopy, vol. 52, No. 10, 1998, pp. 1299-1304.
Bogaerts et al., "Gas Discharge Plasmas and their Applications", Spectrochimica Acta Part B 57, 2001, pp. 609-658.
Bolshov et al., "Investigation of the Dynamic of an Expanding Laser Plume by a Shadowgraphic Technique", Spectrochimica Acta Part B 63, 2008, pp. 324-331.
Borghese et al., "Time-Resolved Spectral and Spatial Description of Laser-Induced Breakdown in Air as a Pulsed, Bright, and Broadband Ultraviolet—Visible Light Source", Applied Optics, vol. 37, No. 18, Jun. 20, 1998, pp. 3977-3983.
Brauch et al., "High-Power Diode Lasers for Direct Applications", Topics Appl. Phys., vol. 78, 1000, pp. 303-368.
Breton et al., "Vacuum-UV Radiation of Laser-Produced Plasmas", Journal of the Optical Society of America, vol. 63, No. 10, 1973, pp. 1225-1232.
Bridges et al., "Investigation of a Laser-Produced Plasma VUV Light Source", Applied Optics, vol. 25, No. 13, Jul. 1, 1986, pp. 2208-2214.
Bridges, "Characteristics of an Opto-Galvanic Effect in Cesium and Other Gas Discharge Plasmas", J. Opt. Soc. Am., vol. 68, No. 3, Mar. 1978, pp. 352-360.

(56) References Cited

OTHER PUBLICATIONS

Bussiahn, R., et al., "Experimental and theoretical investigations of a low-pressure He-Xe discharge for lighting purpose," Journal of Applied Physics, vol. 95, No. 9, May 1, 2004, pp. 4627-4634.
Byer, "Laser-Produced Plasmas: A Compact Soft X-Ray Source with High Peak Brightness", Defence Technical Information Centre, 1989, pp. 1-26.
C10T/C6 Lightshield System Parts Listing, Heraeus Noblelight America LLC, 2015, pp. 1-8.
Cann, "Light Sources in the 0.15-20-μ Spectral Range", Applied Optics, vol. 8, No. 8, 1969, pp. 1645-1661.
Carlhoff et al., "Continuous Optical Discharges at Very High Pressure," Physica 103C, 1981, pp. 439-447.
Carlhoff et al., "High Pressure Optical Discharges", Journal of Physics, 1979, pp. 757-758.
Cedolin et al., "Laser-Induced Fluorescence Measurements of Resonance Broadening in Xenon", Physical Review A, vol. 54, No. 1, 2006, pp. 335-342.
Cedolin, "Laser-Induced Fluorescence Diagnostics of Xenon Plasmas", 1997, pp. 1-96.
Cermax lamps, including models LX300F, LX1000CF, EX300-10F, EX500-13F, EX900C-10F, EX900C-13F, EX1000C-13F, LX125F, LX175F, LX500CF, EX125-10F, EX175-10F, EX500-10F,EX1000C-10F , EX900-10F;PerkinElmer Optoelectronics.
Gwyn, "EVU Lithography Update: The timeline puts the screws to extreme ultraviolet lithography, but engineers rise to the challenge", SPIE, 2002, pp. 1-4.
Hadal et al., "Influence of Ambient Gas on the Temperature and Density of Laser Produced Carbon Plasma", Appl. Phys. Lett. vol. 72, No. 2, 1998, pp. 167-169.
Hanselman, "Laser-Light Thomson and Rayleigh Scattering in Atmospheric-Pressure Laboratory Plasmas", 1993, Department of Chemistry, pp. ii-385.
Hansson et al., "Liquid-Xenon-Jet Laser-Plasma Source for EUV Lithography", SPIE, vol. 4506, 2001, pp. 1-8.
Hansson, "Laser-Plasma Sources for Extreme-Ultraviolet Chaps. 5 & 6", 2003, pp. 1-58.
Harris, "A Century of Sapphire Crystal Growth Proceedings", Proceedings of the 10th DoD Electromagnetic Windows Symposium Norfolk, 2004, pp. 1-56.
Harris, "Review of Navy Program to Develop Optical Quality Diamond Windows and Domes", Naval Air Systems Command, 2002, pp. 1-16.
Harrison et al., "Low-threshold, cw, All-solid-state Ti:Al203 Laser", Optics Letter, vol. 16, No. 8, 1991, pp. 581-583.
Hawke et al., "An Apparatus for High Pressure Raman Spectroscopy", Rev. Sci. Instrum., vol. 45, No. 12, 1974, pp. 1598-1601.
Haysom, "Quantum Well Intermixing of InGaAs(P)/InP Heterostructures", Department of Physics, 2001, pp. ii-224.
Hebner et al., "Measured Pressure Broadening and Shift Rates of the 1.73 μm (5d[3/21]1-6p[5/2]2) Transition of Xenon", Applied Physics Letters, vol. 59, No. 9, 1991, pp. 537-539.
Hecht, "Fiber Lasers: Fiber Lasers: The state of the art", Laser Focus World, 2012, pp. 1-11.
Hecht, "Refraction", Optics (Third Edition), Chapter 4, 1998, pp. 100-101.
High Power Diode Laser, Rofin-Sinar Technologies, Inc., 2000, pp. 1-26.
Horn et al., "Evaluation and Design of a Solid-State 193 nm OPO-Nd:YAG Laser Ablation System", Spectroch mica Acta Part B, vol. 58, 2003, pp. 1837-1846.
Hou et al., "Fiber Laser for EUV Generation", EUV Source Workshop, 2006.
Hou et al., "High Intensity Fiber Lasers: Emerging New Applications and New Fiber Technologies", IEEE LEOS Newsletter, 2007, pp. 22-25.
Hou et al., "High Power Fiber Laser Driver for Efficient EUV Lithography Source with Tin-Doped Water Droplet Targets", Optics Expres,, vol. 16, No. 2, 2008, pp. 965-974.
Hu et al., "Laser Induced Stabilisation of the Welding Arc", 2005, Science and Technology of Welding and Joining, vol. 10, No. 1, pp. 76-81.
Huffman et al., "Absorption Coefficients of Xenon and Argon in the 600-1025 Angstrom Wavelength Regions", The Journal of Chemical Physocs, vol. 39, 1963, pp. 902-909.
Hughes, "Plasmas And Laser Light", University of Essex, 1975, pp. 200-272.
I.M. Beterov et al. "Resonance radiation plasma (photoresonance plasma)", Soy. Phys. Usp. vol. 31, No. 66, 1988, pp. 535-554.
Instruction Manual: LDC-3722 Laser Diode Controller, ILX Lightwave Corporation, 1990, pp. 1-1-4-33.
Zimakov, "Continuous Optical Discharges Sustained by Near-IR Laser Radiation", 42th international conference on plasma physics and CF, 2015, p. 1.
Zhang et al., "Designing a High Performance TEC Controller", Proceedings of SPIE vol. 4913, 2002, pp. 177-183.
Jahier et al., "Implementation of a Sapphire Cell with External Electrodes for Laser Excitation of a Forbidden Atomic Transition in a Pulsed E-Field", Eur. Phys. J.D., vol. 13, 2001, pp. 221-229.
Jansson et al., "Liquid-Tin-Jet Laser-Plasma Extreme Ultraviolet Generation", Applied Physics Letters, vol. 84, No. 13, 2004, pp. 2256-2258.
Jaroszynski et al., "Radiation Sources Based on Laser-Plasma Interactions", Phil. Trans. R. Soc. vol. 364,2006, pp. 689-710.
Jauregui et al., "High-power Fibre Lasers", Nature Photonics, vol. 7, 2013, pp. 861-867.
Jeng et al., "Theoretical Investigation of Laser-Sustained Argon Plasmas," J. Appl. Phys., vol. 60, No. 7, Oct. 1, 1986, pp. 2272-2279.
Jin et al., "New Laser Plasma Source for Extreme-Ultraviolet", Applied Optics, 1995, pp. 2256-2258.
Jinno et al., "Luminance and efficacy improvement of low-pressure xenon pulsed fluorescent lamps by using an auxiliary external electrode", J. Phys. D: Appl. Phys., vol. 40, 2007, pp. 3889-3895.
Jinno et al., "The Afterglow Characteristics of Xenon Pulsed Plasma for Mercury-Free Fluorescent Lamps", Czech. J. Phys., vol. 50, 2000, pp. 433-436.
Johnson, "Ultraviolet Emission Spectra of High-Pressure Rare Gases", 1970, Journal of the Optical Society of America,, vol. 60, No. 12, pp. 1669-1674.
Joshi et al., "Laser-Induced Breakdown Spectroscopy for In-Cylinder Equivalence Ratio Measurements in Laser-Ignited Natural Gas Engines", Applied Spectroscopy, vol. 63, No. 5, 2009, pp. 549-554.
Kaku et al., "Vacuum Ultraviolet Spectroscopic System Using a Laser-Produced Plasma", Journal of Applied Physics, vol. 42, 2003, pp. 3458-3462.
Kaku et al., "Vacuum Ultraviolet Transmission Spectroscopic System using a Laser-Produced Plasma", The Japan Society of Applied Physics, vol. 42, No. 6R, pp. 149-152.
Keefer et al., "Experimental Study of a Stationary Laser-Sustained Air Plasma," Journal of Applied Physics, vol. 46, No. 3, Mar. 1975, pp. 1080-1083.
Keefer et al., "Power Absorption Laser Sustained Argon Plasmas", AIAA Journal, vol. 24, No. 10, 1986, pp. 1663-1669.
Keefer, "Laser-Sustained Plasmas", 1989, pp. 169-206.
Kennedy et al., "A Review of the Use of High Power Diode Lasers in Surface Hardening, Journal of Materials Processing Technology", vol. 155-156, 2004, pp. 1855-1860.
Keyser et al. "Studies of High-Repetition-Rate Laser Plasma EUV Sources from Droplet Targets", Applied Physics A, vol. 77, 2003, pp. 217-221.
Kim et al., "Development of an In Situ Raman Spectroscopic System for Surface Oxide Films on Metals and Alloys in High Temperature Water, Nuclear Engineering and Design", vol. 235, 2005, pp. 1029-1040.
Kindel et al., Measurement of Excited States Density and the VUV-Radiation in the Pulsed Xenon Medium Pressure Discharge, Contrib. Plasma Phys., vol. 36, 1996, pp. 711-721.
Kirk et al., "Methods and Systems for Providing Illumination of a Specimen for Inspection" U.S. Appl. No. 60/806,204, filed Jun. 29, 2006, 48 pages.

(56) References Cited

OTHER PUBLICATIONS

Kirk et al., "Methods and Systems for Providing Illumination of a Specimen for Inspection", U.S. Appl. No. 60/759,846, filed Jan. 17, 2006, 18 pages.
Kirk et al., "Methods and Systems for Providing Illumination of a Specimen for Inspection", U.S. Appl. No. 60/772,425, filed Feb. 9, 2006, 20 pages.
Klein, "Measurements of Spectral Emission and Absorption of a High Pressure Xenon Arc in the Stationary and the Flashed Modes", 1968, pp. 677-685.
Klocke et al., "Investigation into the Use of High Power Diode Lasers for Hardening and Thermal Conduction Welding of Metals", SPIE, vol. 3097, 1997, pp. 592-598.
Knyazev, "Photoresonance Plasma Production by Excimer Lasers as a Technique for Anode-plasma Formation", Nucl. Instr. and Meth. in Phys. Res. A, vol. 415, 1998, pp. 525-532.
Office Action Received for Japanese Patent Application No. 2025-502391, mailed on May 19, 2026, 13 pages including 6 pages of English Translation.

* cited by examiner

INDUCTIVELY COUPLED PLASMA LIGHT SOURCE WITH SWITCHED POWER SUPPLY

CROSS REFERENCE TO RELATED APPLICATION

The present application is a continuation of U.S. patent application Ser. No. 18/077,443, entitled "Inductively Coupled Plasma Light Source with Switched Power Supply", filed on Dec. 8, 2022. The entire content of U.S. patent application Ser. No. 18/077,443 is herein incorporated by reference.

The section headings used herein are for organizational purposes only and should not be construed as limiting the subject matter described in the present application in any way.

INTRODUCTION

Numerous commercial and academic applications have a need for high brightness light in the extreme ultra-violet (EUV) region of the spectrum. For example, EUV light is needed for numerous industrial applications, including metrology, accelerated testing, photoresist, defect inspection, and microscopy. Other applications for EUV light include microscopy, spectroscopy, areal imaging, and blank mask inspection. These and other applications require EUV sources that have high reliability, small physical size, low fixed cost, low operating cost, and low complexity from these important sources of extreme ultraviolet photons.

Known switched power supplies have limited the performance and usefulness of these high brightness light in the extreme ultra-violet (EUV) region of the spectrum because they use magnetic switches which are well known in the art to have numerous performance disadvantages including that they are relatively slow and physically large. New switched power supplies are required to advance the performance of these high brightness EUV light sources.

SUMMARY

A method and apparatus for generating light includes a chamber having a high voltage region, a low voltage region, and a plasma generation region that defines a plasma confinement region. A gas feed port is positioned proximate to the plasma confinement region and a vacuum pump port is positioned proximate to the plasma confinement region. A magnetic core is positioned around a portion of the chamber and is configured to generate a plasma in the plasma generation region that converges in the plasma confinement region.

A switched power supply is electrically connected between the high voltage region and the low voltage region of the chamber and includes a DC power supply and a switched resonant charging circuit that together generate a plurality of voltage pulses at the output causing a plurality of current pulses to be applied to the power delivery section around the magnetic core so that at least one plasma loop is established around the magnetic core that confines plasma in the plasma confinement region, thereby forming a magnetically confined Z-pinch plasma. In some configurations, the low voltage region is electrically connected to ground potential.

The switched power supply includes a charging switch and a discharging switch that can be a solid-state switch, including for example, metal-oxide-semiconductor field-effect transistors, bi metal-oxide-semiconductor field-effect transistors, insulated-gate bipolar transistors, or similar high voltage semiconductor switches. The switched resonant charging circuit includes at least one inductor and at least one capacitor configured so that the at least one inductor increases a voltage across the at least one capacitor during operation. The switched resonant charging circuit can be configured to increase a DC voltage generated by the DC power supply to less than or equal to twice the DC voltage generated by the DC power supply. The switched resonant charging circuit can be configured to provide enough charging current at the output of the switched power supply to sustain the plasma between generation of the voltage pulses. A flux excluder can be positioned proximate to the magnetic core so that the at least one plasma loop flows between the flux excluder and the magnetic core during operation.

A port is positioned adjacent to the plasma generation region to allow light generated by the Z-pinch plasma to propagate out of the light source.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings described below are for illustration purposes only. The drawings are not necessarily to scale; emphasis is instead generally being placed upon illustrating principles of the teaching. The drawings are not intended to limit the scope of the Applicant's teaching in any way.

DESCRIPTION OF VARIOUS EMBODIMENTS

Figure 1:
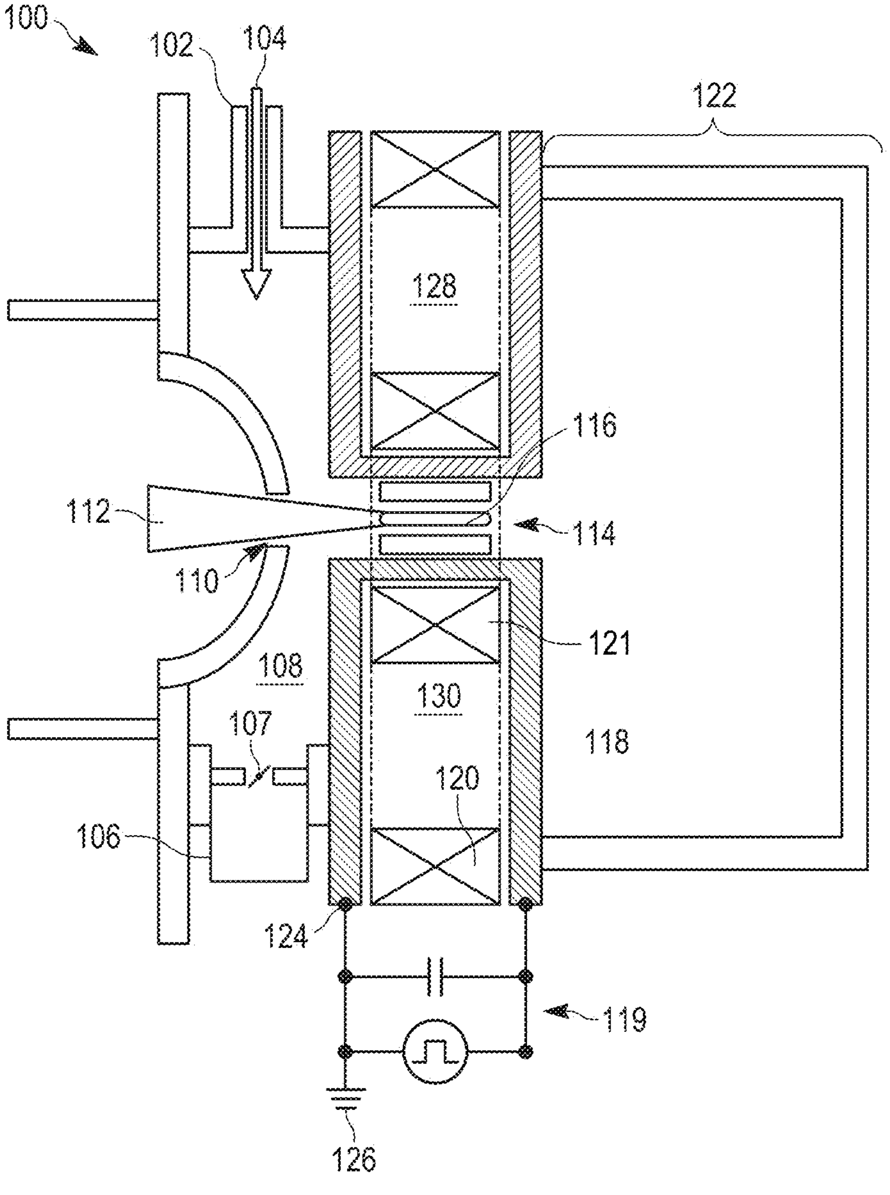
PRIOR ART FIG. 1
FIG. 1 illustrates a cross-section view of a known plasma chamber for generated a Z-pinch ultraviolet light.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications, and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the method of the present teaching can be performed in any order and/or simultaneously as long as the teaching remains operable. Furthermore, it should be understood that the apparatus and method of the present teaching can include any number or all of the described embodiments as long as the teaching remains operable.

Extreme ultraviolet (EUV) light sources play an important role in numerous optical measurement and exposure applications. It is desirable that these sources be configured to accommodate numerous use cases. One challenge is to generate high-power and high-brightness EUV light in a configuration with enough flexibility to allows integration with numerous applications and also exhibits high stability and high reliability.

Extreme ultraviolet radiation is referred to in numerous ways by those skilled in the art. Some skilled in the art sometimes referred to extreme ultraviolet radiation as high-energy ultraviolet radiation, which can be abbreviated as XUV. Extreme ultraviolet radiation generally refers to electromagnetic radiation that is part of the electromagnetic spectrum nominally spanning wavelengths from 124 nm to 10 nm. There is some overlap between extreme ultraviolet radiation and what is considered to be the optical spectrum. One particular EUV wavelength of interest is 13.5 nm because that wavelength is commonly used for lithography. Extreme ultraviolet radiation sources, according to the present teaching, are not limited to the generation of EUV radiation. As is known in the art, plasmas can be used to generate a wide spectral range of photons. For example, plasmas generated according to the present teaching can also be used to generate soft x-ray photons (SXR). This includes, for example, photons with wavelengths of less than 10 nm.

So-called Z-pinch plasmas, which have current in the axial direction, have been shown to be effective at producing EUV and SXR light. However, most known sources have employed electrodes to conduct high discharge currents into the plasma. These electrodes, which are typically in contact with high temperature plasma, can melt and produce significant debris, which is highly undesirable as it can greatly reduce the useful lifetime of the source.

Electrodeless approaches to generated EUV are desirable and fill a considerable market need. Such sources are available, for example, from Energetiq, a Hamamatsu Company, located in Wilmington, MA. These sources are based on a Z-pinch plasma, but avoid electrodes entirely by inductively coupling current into the plasma. The plasma in these EUV sources is magnetically confined away from the source walls, minimizing the heat load and reducing debris and providing excellent open-loop spatial stability, and stable repeatable power output. One challenge with known Z-pinch light sources is that their performance, especially in brightness, is limited by their power supplies because they use magnetic switches, which are highly undesirable, and not flexible or easily scaleable.

One feature of the EUV sources of the present teaching is that they are versatile and support various applications with high brightness. In particular, EUV sources of the present teaching improve upon known Z-pinch designs because they can be optimized for peak power and/or for peak brightness as required by the user for a particular application. In addition, EUV sources of the present teaching have a more compact physical foot print and a more flexible component layout.

FIG. 1 illustrates a known plasma chamber 100 for generating a Z-pinch ultraviolet light. See, for example, U.S. patent application Ser. No. 17/676,712, entitled "Inductively Coupled Plasma Light Source", which is assigned the present assignee. The entire contents of U.S. patent application Ser. No. 17/676,712 are incorporated herein by reference.

The chamber 100 includes an interface 102 that passes a feed gas 104 into the chamber 100. A pump 106 is used to evacuate the chamber region 108 to a desired operating pressure and/or to control gas flow in the chamber 100 using a butterfly valve 107 or other means of controlling conductance. A port 110 is provided to pass EUV radiation 112 generated by the EUV plasma.

In various systems, the port 110 is configured to be adaptable for a user to attach to an application system (not shown) where the EUV radiation passes directly through the port 110. A plasma generation region 114 defines a plasma confinement region 116. The plasma confinement region 116 is formed by magnetic induction when a pulse forming and power delivery system 118 provides a current that interacts both actively and passively with magnetic cores 120, 121. A high voltage region 122 is attached to the plasma generation region 114. A low voltage region 124 has an outer surface that is coupled to low voltage potential, which in some embodiments is ground 126 as shown in FIG. 1. A pulsed power supply 119 that uses magnetic switches is electrically coupled to the power delivery system 118. The chamber 100 also includes region 128 between the inner and outer magnetic cores 121, 120 where the current carried by the inductively coupled plasma flows. During operation of the Z-pinch plasma in this known chamber 100, the feed gas in the plasma generating region 114 is compressed by the electric pulses generated by the pulsed power supply 119, followed by an expansion of the gas after the pulse.

Figure 2:
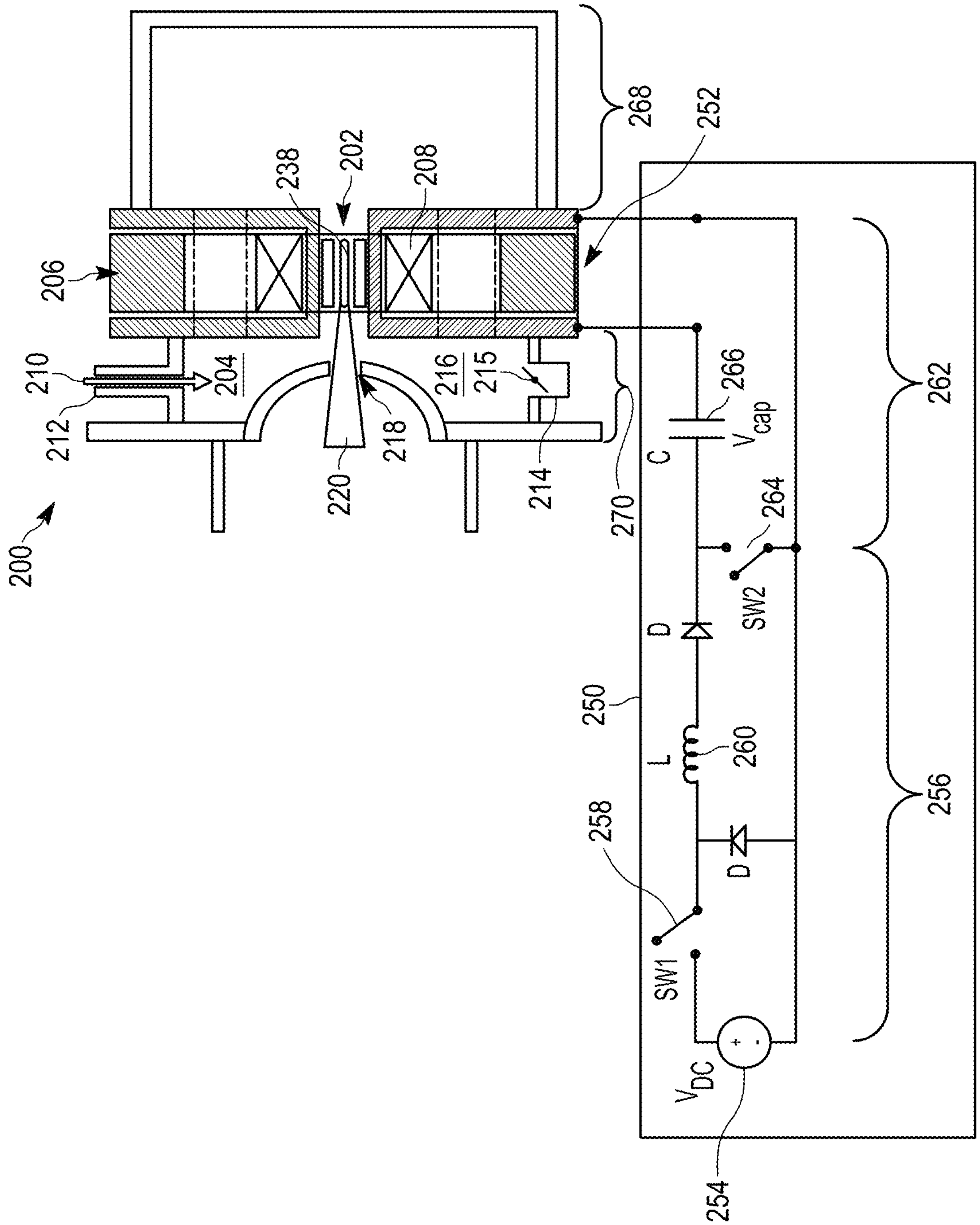
FIG. 2 illustrates an ultraviolet light source that includes a solid-state pulsed power supply and power delivery section according to the present teaching.

FIG. 2 illustrates an ultraviolet light source 200 that includes a solid-state pulsed power supply 250 and power delivery section 252 according to the present teaching. The source 200 is an inductively coupled design that uses magnetic confinement of the plasma in the plasma confinement region 238 where a Z-pinch is generated away from the components of the chamber 204 to provide high reliability and high stability. A flux excluder 206 is used to increases the confinement of magnetic flux in the power delivery section, thus reducing the inductance. In operation, one or more plasma loops flow through the flux excluder region 206 and through the plasma generation region 202, making a plasma loop around the inner magnetic core 208. The plasma loops themselves do not produce significant EUV light A target gas 210 enters through an interface 212 into the chamber 204. In some embodiments, the target gas is Xenon. A pump 214 is used to evacuate the chamber region 216 to a desired operating pressure. A valve, such as a butterfly valve 215, is used to control the pressure in the chamber region 216. A transparent port 218 is provided to pass EUV radiation, that is, EUV light 220 generated by the plasma. This port 218 can be, for example, any of the various kinds of ports described in connection with the port 110 of FIG. 1.

A solid-state pulsed power supply (PPS) 250 is used to drive current through the power delivery section 252 to a low voltage region to generate the plasma. In one specific embodiment, the low voltage region is ground. However, it should be understood that the low voltage region is not necessarily at ground potential. The solid-state pulse power supply 250 is connected to the power delivery section 252 at a high voltage side 268 and a low voltage side 270. In some configurations, a diameter of plasma confinement region 238 is smaller than a diameter of a high voltage region electrically coupled to the high voltage side 268. The pulsed power system 250 includes a DC power supply 254 that provides a DC voltage (VDC) at an output. A resonant charging subsystem 256 with a charging switch 258 and an inductor 260 is coupled to the output of the DC power supply 254. The resonant charging subsystem 256 is configured to approximately double the voltage provided by the DC power supply 254 at the capacitor 266. This is accomplished using inductive energy storage with the inductor 260 to effectively double the voltage provided by the DC power supply 254 at the capacitor 266. In other words, the resonant charging subsystem 256 and the capacitor 266 form a resonant charging circuit.

Figure 3A:
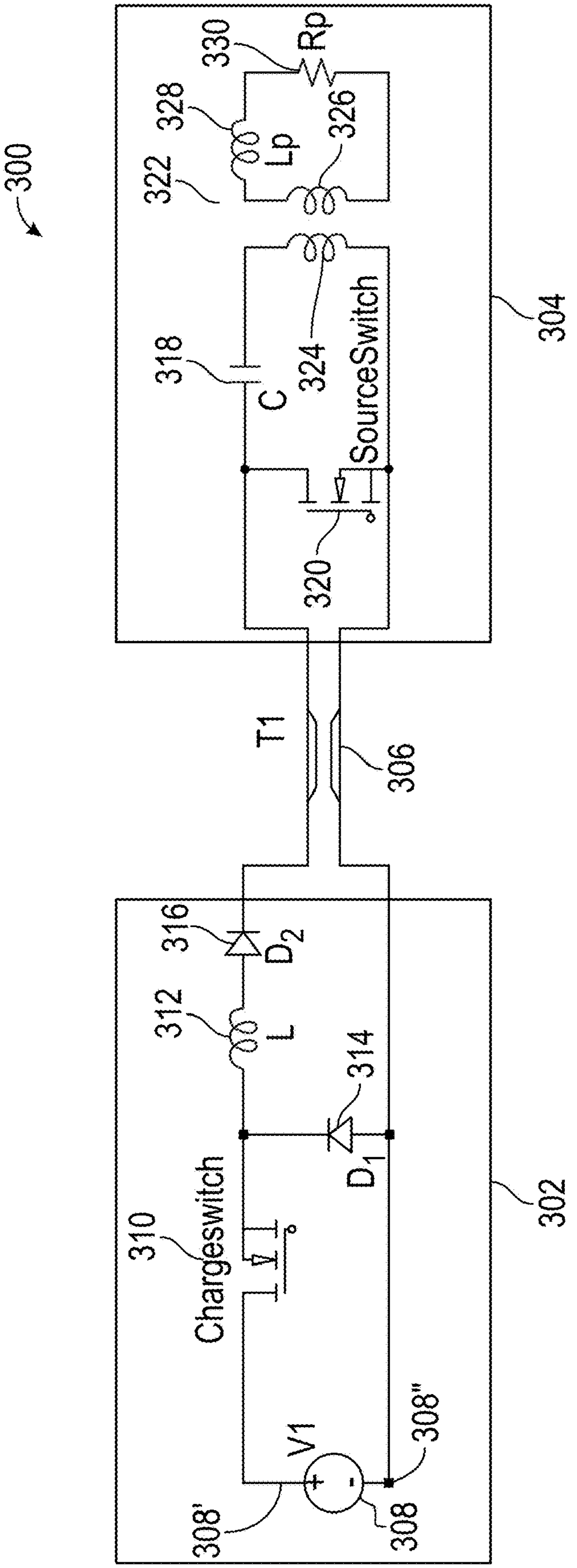
FIG. 3A illustrates a schematic diagram of a solid-state pulsed power and delivery system for an ultraviolet light source according to the present teaching.

The solid-state pulsed power supply 250 also includes a solid-state switch subsystem 262 that includes a discharge switch 264 and at least one capacitor 266 that generates the current necessary to form a plasma. The at least one capacitor is typically a plurality of capacitors as described in connection with FIG. 3B. FIG. 3A illustrates a schematic diagram of a solid-state pulsed power and delivery system 300 for an ultraviolet light source according to the present teaching. The system 300 includes a resonant charging subsystem 302, a solid-state switch subsystem 304, and a transmission line system 306 coupling the resonant charging subsystem 302 and the solid-state switch subsystem 304. The resonant charging subsystem 302 includes a DC power supply 308 that can be, for example, a 1 kV power supply as one particular embodiment that generates a high voltage in the range of about 500V to 1 kV. Other embodiments can have the DC power supply 308 operating in the several kV range. The DC power supply 308 provides a DC voltage to the charging switch 310, which in many embodiments, includes a high-power solid-state switch that switches the output voltage of the DC power supply 308. In recent years, there have been great advances in the performance of high-power solid-state device technology. For example, Heterojunction Bipolar Transistor (HBT), Insulated Gate Bipolar Transistor (IGBT), Silicon Carbide Metal-Oxide-Semiconductor Field-Effect Transistor (SiCFET), and Bi Metal-Oxide-Semiconductor Field-Effect Transistor (BiMOSFET) are examples of robust high-power and fast-switching solid-state switches that are useful for power supplies according to the present teaching. BiMOSFET devices are particularly useful because they combine the strengths of MOSFET devices with the strengths of IGBT devices to achieve a positive temperature coefficient of $V_{ce}$ (voltage difference between the collector and emitter) and $V_f$ (forward voltage). BiMOSFET devices also advantageously feature low conduction losses making them particular suitable for high-frequency and/or high-power density applications.

When the charging switch 310 is closed, the voltage generated by the DC power supply 308 is applied to the inductor 312 that stores energy for the pulses. The inductor 312 is one or more inductors coupled in series that provides a large inductance value. For example, in some systems, the total inductance value of inductor 312 can be on order of 1-10 micro-H or higher in some embodiments.

Diodes D1 314 and D2 316 prevent current passed by the charging switch 310 from reversing and also provide a charging current that pre-ionizes the plasma, thereby sustaining the plasma loop. The resonant charging subsystem 302 is configured to approximately double the voltage provided by the DC power supply at the capacitor 318. We note that the resonant charging subsystem 302, transmission line 306, and capacitor 318 form the resonant charging circuit.

The transmission line system 306 couples the voltage generated by the resonant charging subsystem 302 to the solid-state switch subsystem 304. The solid-state switch subsystem 304 includes a capacitor 318 and a solid-state discharge switch 320. In many embodiments, the capacitor 318 is a bank of multiple parallel-connected capacitors that provides a relatively high capacitance value at comparatively low inductance. For example, in one specific embodiment, the total capacitance value of capacitor 318 can be on order of 3,000 nF. With the specific embodiment described, the peak pre-pulse current is in the range of 380 Amps with a half sine wave charging time of in the 15-20 microsecond range.

The schematic diagram of a solid-state pulsed power and delivery system 300 shows the power delivery section 252 (FIG. 2) as the primary 324 and the plasma as the secondary 326 of the transformer 322. Current pulses generated by the solid-state switch subsystem 304 are applied to a primary 324 of the transformer 322 via the power delivery section 252. The plasma itself is modeled as the secondary 326 of the transformer 322 having both an inductive component 328 and resistive component 330.

Pulsed operation of the solid-state pulsed power and delivery system 302 is accomplished by switching through two solid-state switches, the charging switch 310 in the resonant charging subsystem 302 and the discharging switch 320 in the solid-state switch subsystem 350. The charging switch 310 in the resonant charging subsystem 302 applies high-voltage pulses across the capacitor 318 or capacitor bank in the solid-state switch subsystem 304. When the charging switch 310 is closed, current flows through the resonant charging subsystem 302 and charges the capacitor 318. The diodes D1 314 and D2 316 are configured to ensure the desired direction of current flow and are also configured so that a charging current is provided that pre-ionizes the plasma, thereby sustaining the plasma loop in between pulses. The charging voltage including the maximum charging voltage can be expressed with the below equations.

$$V_c = V_{DC}\left(1 - \cos\left(\frac{t}{\sqrt{LC}}\right)\right)$$

$$V_c = 2V_{DC} \text{ at } t = \pi\sqrt{LC}$$

The pre-pulse current is given by the following equation:

$$i = \frac{V_{DC}}{\sqrt{\frac{L}{C}}}\sin\left(\frac{t}{\sqrt{LC}}\right)$$

The pre-ionization is important because Z-pinch operation requires a sustained plasma loop because continually ionized gas is necessary for proper function. The discharge switch 320 is closed when the maximum voltage across capacitor 318 is reached.

Referring to both FIGS. 2 and 3A, the resulting discharge causes capacitor 318 to drive a current through the high voltage side 268 and the low voltage side 270 of the power delivery section 252. Consequently, the inner magnetic core 208 couples the current pulse to the plasma loops, resulting in a large current pulse in the plasma that forms loops that flow through the flux excluder region 206 and through the plasma confinement region 202, making a loop around the inner magnetic core 208. In some embodiments, at least three inductively coupled plasma loops converge in the plasma confinement region 202 to form a magnetically confined Z-pinch. The plasma confinement region 202 produces and emits nearly 100% of the EUV radiation generated by the plasma. The result is that the source 200 produces high quality EUV light 236 from a well-defined and stable pinch plasma confinement region 202. Importantly, the source 200 is a highly compact source compared with other known sources for generating stable pinch plasma suitable for light source applications. These features are made possible by the solid-state switching power supply of the present teaching.

Another feature of the present teaching is that the solid-state pulsed power system pulse forming and power delivery section 300 can be constructed with the power supply components on multiple circuit boards so that the power supply can be configured in a relatively small area compared with known switching power supply technologies.

Figure 3B:
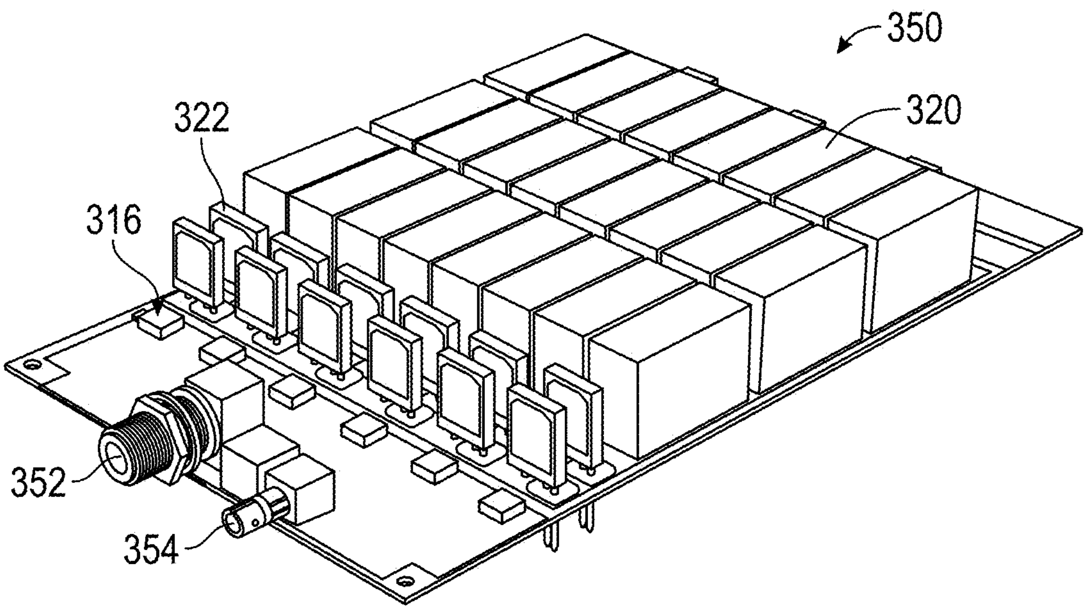
FIG. 3B illustrates a perspective view of a single board solid-state switch subsystem according to the present teaching.

FIG. 3B illustrates a perspective view of a single board solid-state switch subsystem 350 according to the present teaching. The solid-state switch subsystem 350 includes banks of capacitors 320 configured in parallel to present a relatively large capacitance. For example, such a solid-state switch subsystem 350 can include, in one particular embodiment suitable for commercial products, 24 capacitors 320 on a single board to present a capacitance of approximately 528 nF. The solid state switches 322 are BiMOSFET switches in this particular embodiment that are integrated on the single board subsystem 350 and configured with diodes that protect components 310, 314, 316, 320, and 322 from voltage reversals as described in connection with FIG. 3A. Referring also to FIG. 3A, the connector 352 that couples the solid-state switch subsystem 350 to the charging cable 306 which couples to the charging subsystem 302 is also included on the subsystem 350. In addition, a fiber coupler 354 is shown for coupling an optical fiber from a controller to the solid-state switch subsystem 350 that is used for high-speed triggering the switches 322.

Figure 3C:
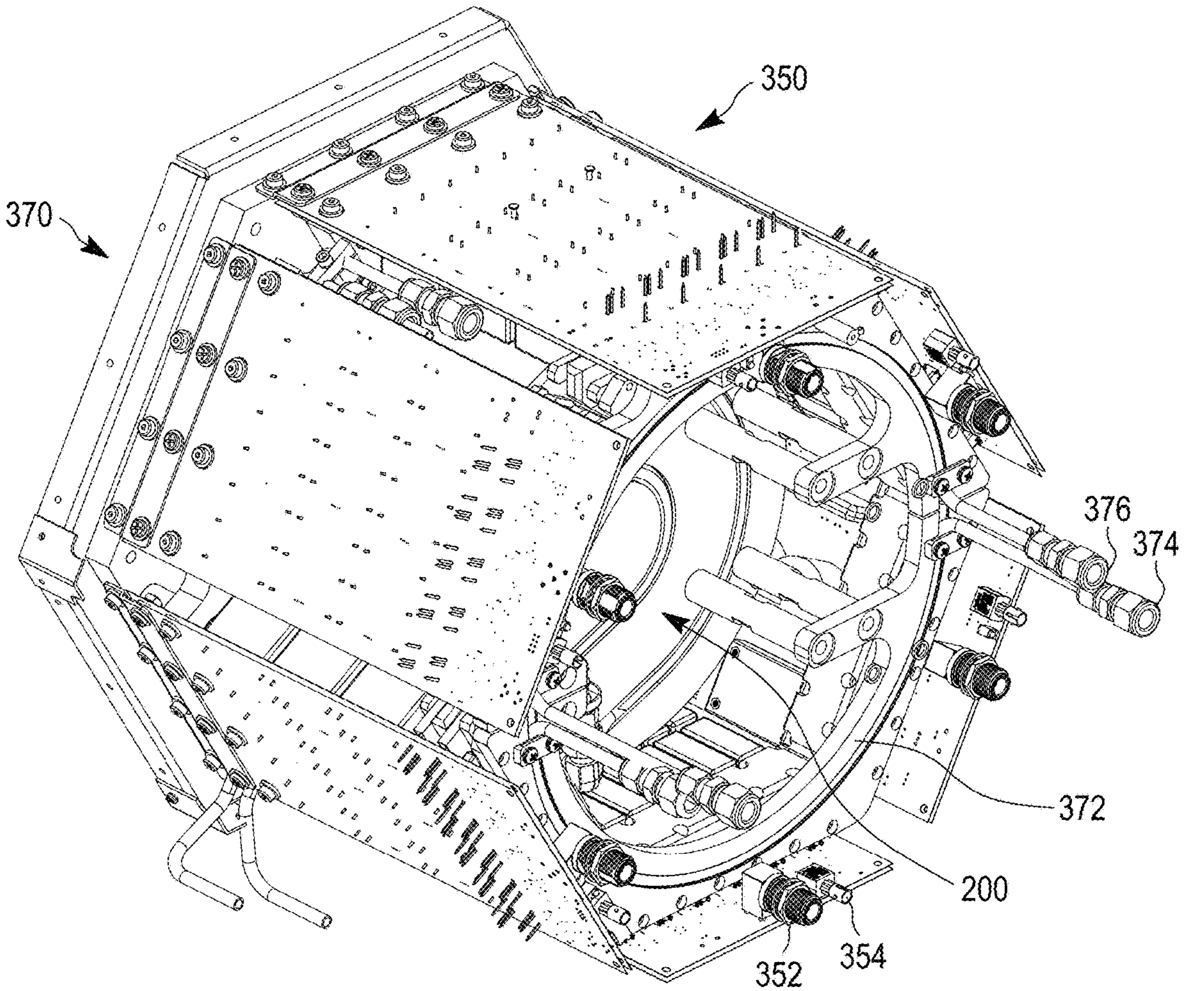
FIG. 3C illustrates an example of a solid-state switch subsystem that includes a six-board power supply configured radially in parallel.

FIG. 3C illustrates an example of a solid-state switch subsystem 370 that includes a six-board power supply configured radially in parallel with, for example 24 capacitors 320 per board with a total capacitance in the range of 3000 nF, as described in connection with FIG. 3B. Other embodiments can include any number of capacitors 320 per board with a total capacitance in the range of several microfarads. Referring to all of FIGS. 3A, 3B, and 3C, the capacitors 320 are charged with the resonant charging subsystem.

The radial configuration of the solid-state switch subsystem 370 has highly efficient thermal management. In some configurations, a cooling ring 372 that is feed with cooling fluid, such as water, via fluid inlet 374 and fluid outlet 376 is positioned around the circumference of the solid-state switch subsystem 370 to provide temperature control The radial configuration of the solid-state switch subsystem 370 is also highly compact. In order to make the entire pulsed power source more compact, fiber optical cables can be coupled to the fiber coupler 354 and are used to trigger the discharging switches 322 at peak voltage by triggering the switches 322 as described in connection with FIG. 3B.

Figure 4:
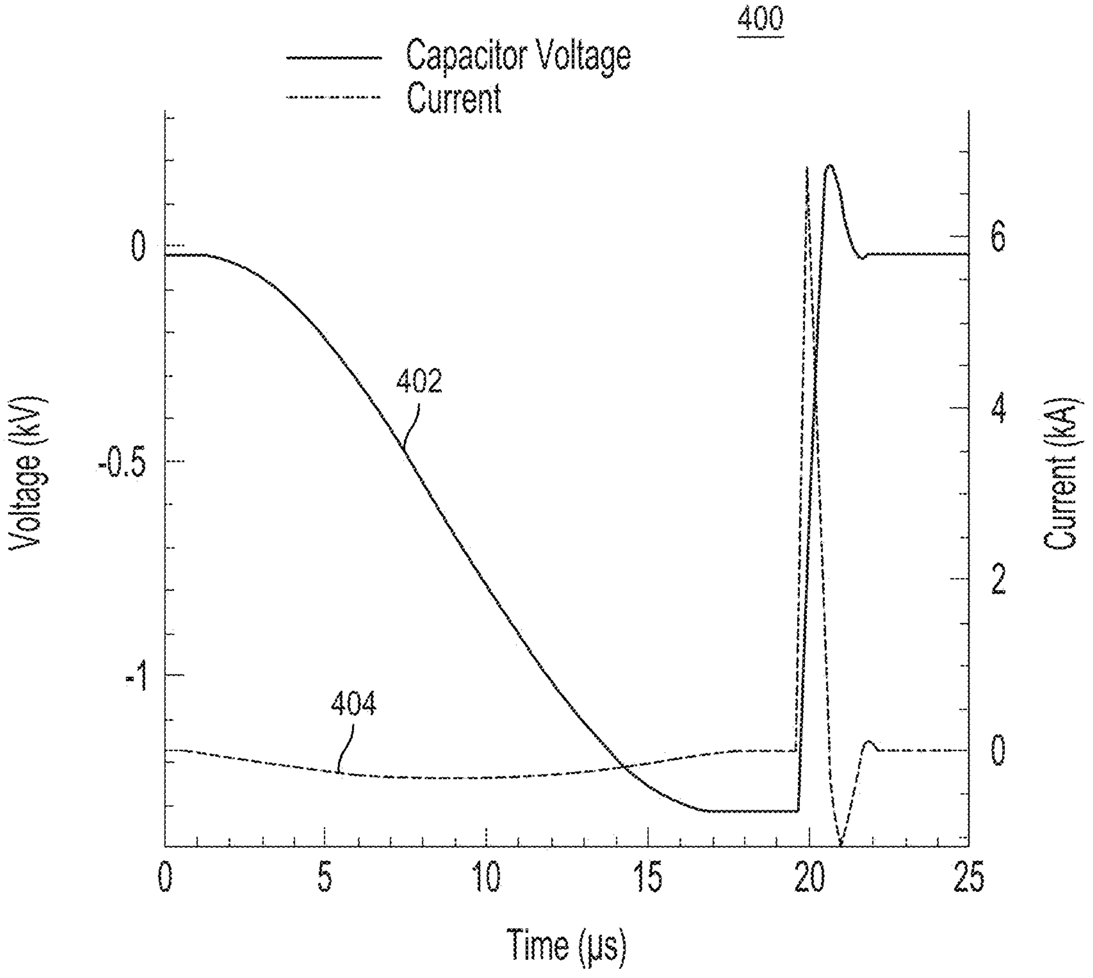
FIG. 4 illustrates plots of current through and voltage across a charging capacitor in a solid-state switch subsystem in a power supply according to the present teaching.

FIG. 4 illustrates plots 400 of current through and voltage across a charging capacitor in a solid-state switch subsystem in a power supply according to the present teaching. The plot 402 represents voltage in Volts across the charging capacitor in the solid-state switch subsystem as a function of time in microseconds. The plot 404 represents current in kAmps flowing through the charging capacitor as a function of time in microseconds. The plots 400 indicate that when the elapsed time reaches about 20 microseconds, a large voltage pulse is established, which can be on order of about 1.3 k KV with an associated peak current pulse of about 6.8 kA.

Thus, one important feature of the present teaching is that since the solid-state charging switch 310 and the solid-state discharging switch 320 do not work on magnetic saturation like known power supplies for generating Z-pinched inductively coupled plasmas, they can be conveniently located inside the power supply unit itself. This allows designers to locate the switching devices next to the capacitors 320 on the switch board itself, which has the advantage that it minimizes inductance. This is possible, at least in part, because the FET switching devices themselves are compact especially when compared with magnetic switches. Such a configuration is not possible in known systems that use coupling core magnetic circuits as simplicity and space requirements make such configurations impractical for a commercial product.

There are many advantages of the solid-state pulsed power system pulse forming and power delivery second according to the present teaching. One advantage is that by using the pulsed power system according to the present teaching to drive and contain the plasma, the plasma source 200 (FIG. 2) operates without the use of electrodes that are commonly used to conduct discharge current to the plasma in known systems.

Another advantage of the solid-state pulsed power system of the present teaching is that the resonant charging with the inductive energy storage and voltage doubling as described herein allows for much higher frequency operation compared with prior art systems. For example, when solid state switching devices are used for switches 310 and 320, a frequency of operation in the range of 10 KHz can be easily achieved, and significantly higher frequency operation is possible. Furthermore, when solid-state switching devices are used, a wide range of pulse energies can be obtained. For example, with commercially available devices, the pulse energy can be in the range of several Joules. Consequently, with the higher frequency of operation and higher pulse energies, much higher brightness can be achieved in a light source using the solid-state pulsed power system of the present teaching.

Yet another advantage of the solid-state pulsed power system of the present teaching is that the power supply can generate a controllable amount of charging current pulses that can be used to produce a pre-ionization current that is sufficient to obtain desired Z-pinching conditions. The solid-state pulsed power systems of the present teaching are highly adjustable to generate a wide range of pre-ionization pulse conditions. Suitable pre-ionization pulses are much smaller than the pulses primarily used generate the plasma. Typically, the pre-pulse will have a maximum current in the sub kiloamp range whereas the main pulse will have a maximum current of 5-10 kA. However, these power systems can generate highly adjustable pulses to provide flexible operation.

Thus, another feature of the power supplies of the present teaching is that these power supplies can generate pulses with highly adjustable dwell time. By dwell time, we mean the delay after the charging time and before the main capacitor discharge. One measure of charging time is the time that the switches 310 in the resonant charging subsystem 302 are closed. In one specific embodiment, the dwell time is controllable from below one 1 to over 50 microseconds in order to provide more desirable and varied operating conditions.

As described herein, pre-ionization is necessary to obtain favorable Z-pinch plasma generation conditions. Also, as described herein, pre-ionization according to the present teaching is accomplished by generating a pre-pulse from current leakage for charging where the amplitude of the pre-pulse is much less than the main pulse that generates the Z-pinched plasma. The dwell time, which is roughly the time between the pre-pulse and the main pulse is chosen to provide the desired Z-pinching conditions.

One skilled in the art will appreciate that there are numerous methods of generating ultraviolet light according to the present teaching. These methods generally provide a feed gas to a plasma confinement region 202 in a plasma chamber 204 (FIG. 2). Some methods also apply a feed gas or a second gas to a port positioned at one or more of various locations. A high voltage pulse is applied to a high voltage region 268 connected to the plasma confinement region 202 in the plasma chamber 204 relative to a low voltage region 270.

A train of voltage pulses are generated by the solid-state pulsed power supply 300 and are applied to at least one capacitor 318 electrically connected across a power delivery section 304 surrounding an inner magnetic core 208 that is positioned around the plasma confinement region 202. The train of voltage pulses cause the at least one capacitor 318 to charge until a voltage maximum is reached and the solid state discharge switch 320 is closed resulting in the at least one capacitor discharging causing the inner magnetic core 208 to couple current pulses into the plasma confinement region 202, thereby forming a plasma in a loop where the plasma is sustained between voltage pulses by a charging current that causes pre-ionization as described herein. The resulting plasma generates ultraviolet light that propagates through a transparent port 218 positioned adjacent to the plasma confinement region 202.

It should be understood that there are numerous performance advantages inherent in the solid state switching pulsed power system according to the present teaching that is used to drive current pulses. The system allows flexibility over traditional magnetically switched systems which are limited by eddy current and hysteresis losses in the magnetic switch core region. Importantly, frequency of current pulses can be greatly increased compared with known systems that use magnetically switched power supplies. Also, the energy per pulse can be significantly increased compared with known systems that use magnetically switched power supplies. The result of these enhancements is an increase in the production of EUV radiation and much more flexible operation.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A light source comprising:

a) a chamber comprising a plasma generation region that defines a plasma confinement region;

b) a magnetic core positioned around a portion of the chamber, the magnetic core configured to generate a plasma in the plasma generation region that converges in the plasma confinement region;

c) a switched power supply having an output that is electrically connected to the chamber, the switched power supply comprising a charging circuit that generates a plurality of voltage pulses at the output causing a plurality of current pulses to be applied to a power delivery section around the magnetic core so that at least one plasma loop is established around the magnetic core that confines plasma in the plasma confinement region, thereby forming a magnetically-confined plasma; and d) a port positioned adjacent to the plasma generation region that allows light generated by the plasma to propagate out of the light source.

2. The light source of claim 1, wherein the switched power supply comprises a charging switch and a discharging switch.

3. The light source of claim 2, wherein at least one of the charging switch and the discharging switch comprise a solid state switch.

4. The light source of claim 2, wherein at least one of the charging switch and the discharging switch comprise a field effect transistor (FET).

5. The light source of claim 2, wherein at least one of the charging switch and the discharging switch comprise a Bi Metal-Oxide-Semiconductor Field-Effect Transistor (BiMOSFET) device.

6. The light source of claim 2, wherein at least one of the charging switch and the discharging switch comprise an Insulated Gate Bipolar Transistor (IGBT).

7. The light source of claim 1, wherein the switched charging circuit is configured to provide enough charging current at the output of the switched power supply to sustain the at least one plasma loop between generation of the plurality of voltage pulses.

8. The light source of claim 1, further comprising a flux excluder positioned proximate to the magnetic core so that the at least one plasma loop flows between the flux excluder and the magnetic core during operation.

9. The light source of claim 1, wherein a portion of the chamber connected to the power supply is electrically connected to ground potential.

10. The light source of claim 1, wherein the switched charging circuit comprises a resonant charging circuit.

11. The light source of claim 1, wherein the switched charging circuit does not use resonant charging.

12. The light source of claim 10, wherein the switched resonant charging circuit comprises at least one inductor and at least one capacitor configured so that the at least one inductor increases a voltage across the at least one capacitor during operation.

13. The light source of claim 1, wherein the switched charging circuit comprises a capacitor bank comprising multiple parallel-connected capacitors.

14. The light source of claim 1, further comprising a gas feed port positioned proximate to the plasma confinement region.

15. The light source of claim 1, further comprising a vacuum pump port positioned proximate to the plasma confinement region.

16. A method of generating an inductively coupled plasma, the method comprising:

a) configuring a chamber that defines a plasma confinement region within a plasma generation region;

b) surrounding a portion of the chamber with a magnetic core configured to converge a plasma in the plasma confinement region;

c) generating a plurality of voltage pulses; and d) applying the generated plurality of voltage pulses across a power delivery system coupled to the chamber, thereby causing a plurality of current pulses to be applied to a power delivery section around the magnetic core so that at least one plasma loop is established around the magnetic core that confines plasma in the plasma confinement region, thereby forming a magnetically confined Z-pinch plasma.

17. The method of claim 16, further comprising electrically coupling a portion of the chamber to ground potential.

18. The method of claim 16, further comprising applying a current to the power delivery section around the magnetic core that sustains the at least one plasma loop between generation of the plurality of voltage pulses.

19. The method of claim 16, wherein the current applied to the power delivery section around the magnetic core that sustains the at least one plasma loop between generation of the voltage pulses is applied at times between the plurality of voltage pulses.

20. The method of claim 16, further comprising increasing the confinement of magnetic flux in the plasma confinement region using a flux excluder positioned proximate to the magnetic core.

21. The method of claim 16, further comprising providing feed gas proximate to the plasma confinement region.

22. The method of claim 16, further comprising pumping gas proximate to the plasma confinement region.

* * * * *